United States Patent [19]
Le Roy et al.

[11] Patent Number: 5,105,292
[45] Date of Patent: Apr. 14, 1992

[54] ASYNCHRONOUS OPTICAL COMMUNICATION SYSTEM

[75] Inventors: Guy Le Roy, Lannion; Jean-Michel Gabriagues, Le Val Saint-Germain, both of France

[73] Assignee: Alcatel CIT, Paris, France

[21] Appl. No.: 587,712

[22] Filed: Sep. 25, 1990

[30] Foreign Application Priority Data

Oct. 2, 1989 [FR] France .............................. 89 12842
Mar. 29, 1990 [FR] France .............................. 90 04034

[51] Int. Cl.$^5$ ............................................. H04J 14/00
[52] U.S. Cl. ................................. 359/123; 359/117; 370/50
[58] Field of Search ..................... 370/1, 3, 4, 50; 359/117, 123

[56] References Cited

U.S. PATENT DOCUMENTS

4,873,681 10/1989 Arthurs ................................... 370/3

FOREIGN PATENT DOCUMENTS

0077292 1/1986 European Pat. Off. .
0268355 5/1988 European Pat. Off. .
0310058 4/1989 European Pat. Off. .
2593654 3/1988 France .
2586874 5/1988 France .

OTHER PUBLICATIONS

"Demonstration of Fast Wavelength Tuning for a High Performance Packet Switch", M. S. Goodman et al.; Bell Communications Research Conference on optical communications, 1988.

Patent abstracts of Japan, vol. 7, No. 158 (E-186)[1303], Jul. 12, 1983; & JP-A-58 66 488 (Fujitsu K.K.) 4/20/83.
Patent Abstracts of Japan, vol. 10, No. 8 (E-373)[2065], Jan. 14, 1986; & JP-A-60 172 841 (Nippon Denshin Denwa Kosha) 9/6/85.
Patent Abstracts of Japan, vol. 10, No. 370 (E-463)[2427], Dec. 10, 1986; & JP-A-61 395 (NEC Corp.) 7/25/86.

*Primary Examiner*—Edward L. Coles, Sr.
*Assistant Examiner*—L. Pascal
*Attorney, Agent, or Firm*—Sughrue, Mion, Zinn, Macpeak & Seas

[57] ABSTRACT

An asynchronous time-division multiplex optical communication system comprises: a switching network, user transmitter circuits, user receiver circuits and broadcast servers connected by optical lines to the switching network. The switching network comprises an optical spectro-time-division switching network, a control processor unit and a clock unit. The spectro-time-division switching network is connected optically to the user transmitter circuits, to the user receiver circuits, to the broadcast servers and to control transmitter, signalling transmitter, control receiver and signalling receiver circuits of the control processor unit. The clock unit is connected by a first line to the switching network and by a second line to the control processor unit which is connected by a control bus to the spectro-time-division switching network. The system uses conjointly a first set of optical frequencies for transmission and a second set optical frequencies for switching.

33 Claims, 14 Drawing Sheets

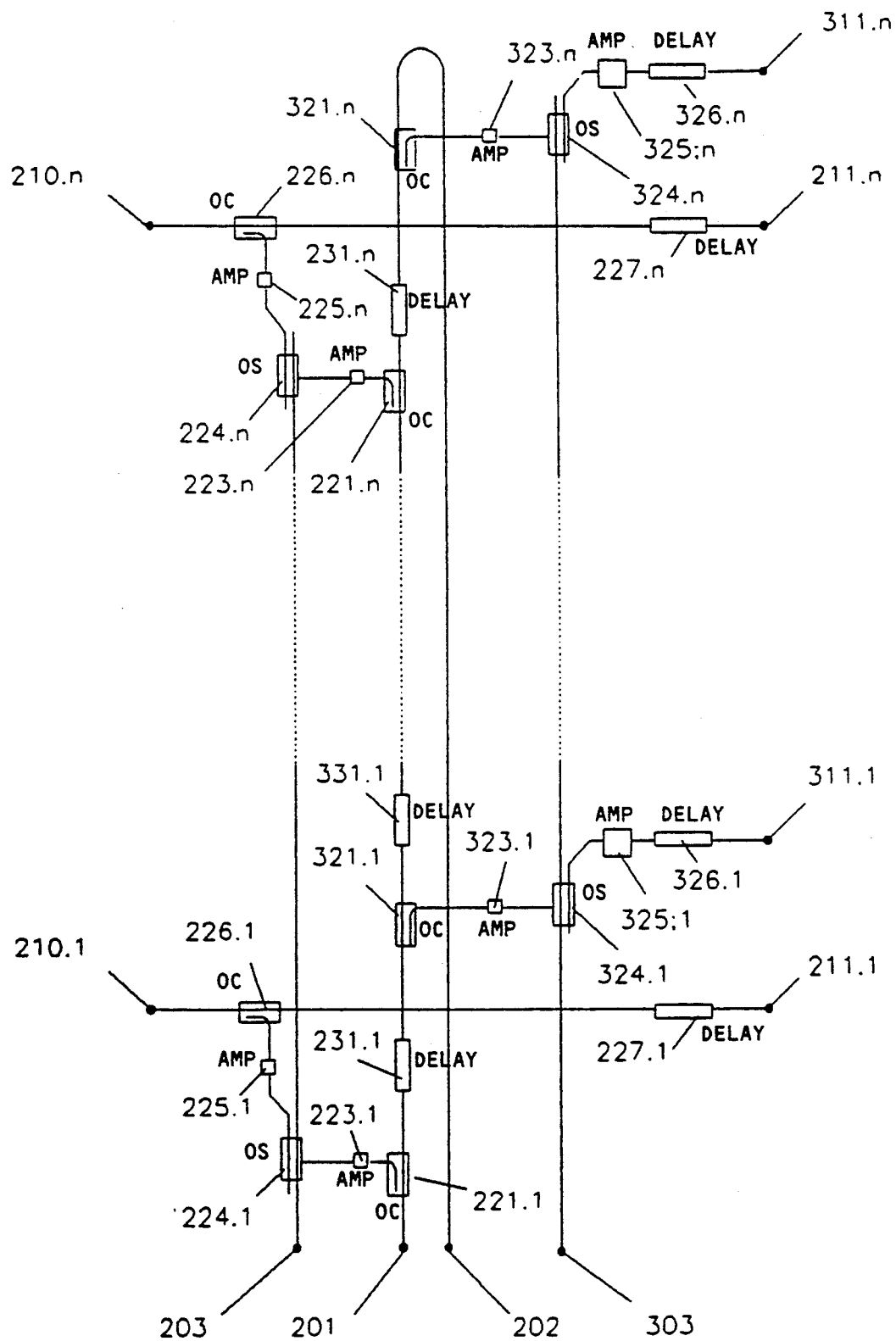
FIG. 3.A

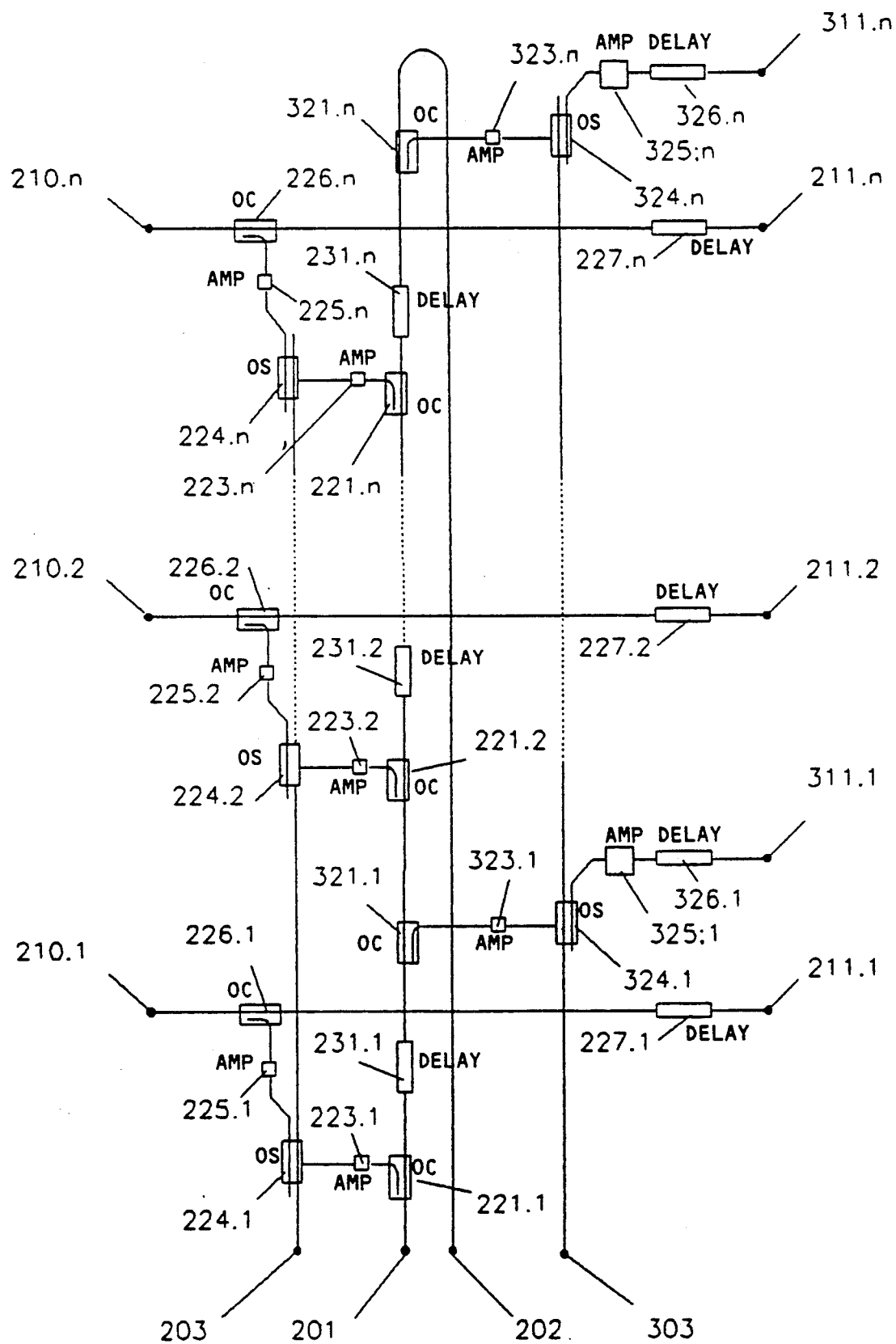
FIG. 3.B

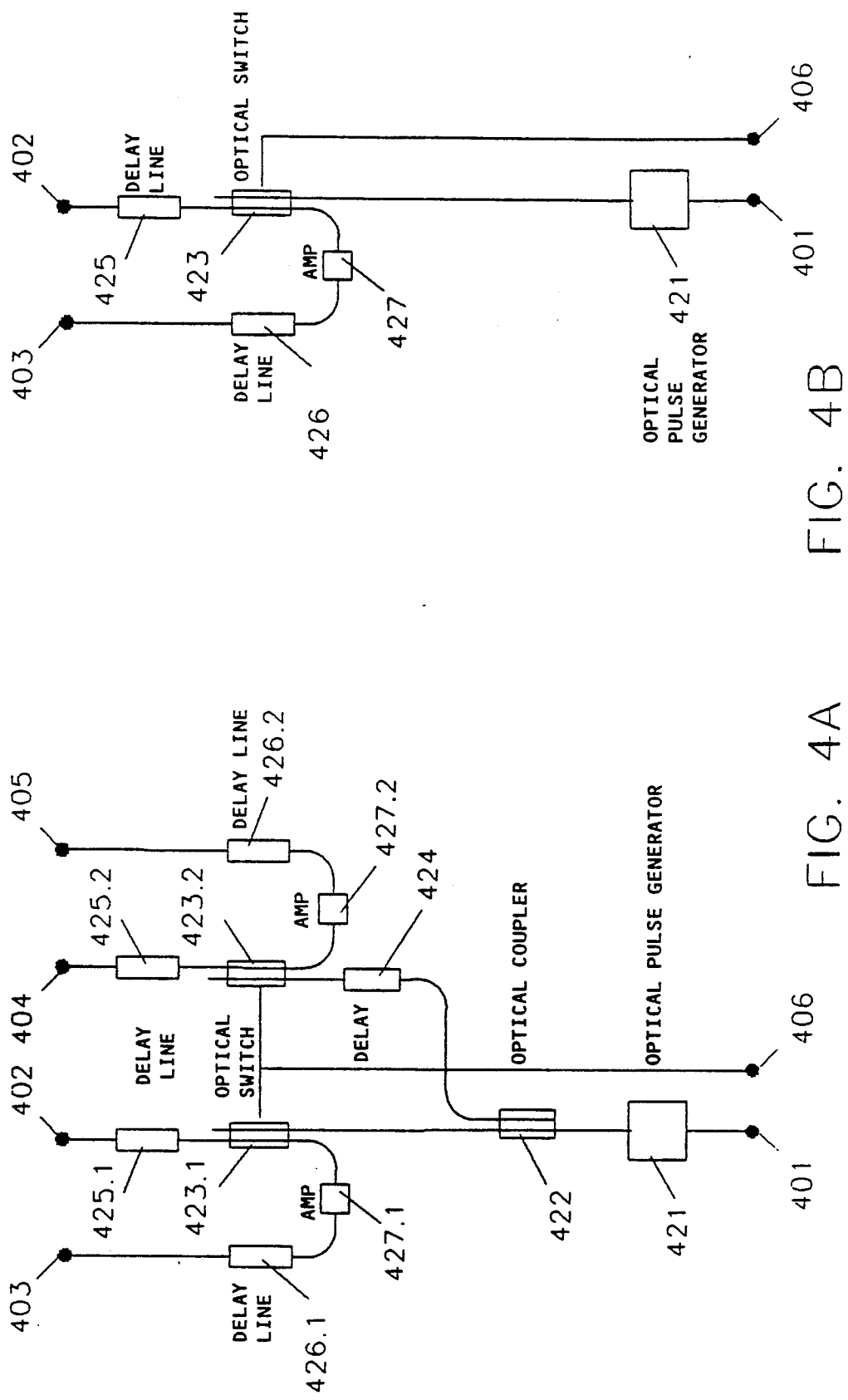

ASYNCHRONOUS OPTICAL COMMUNICATION SYSTEM

BACKGROUND OF THE INVENTION

1. Field of the invention

The invention concerns an optical time-division multiplex broadband multiservice communication system operating asynchronously and enabling the implementation of integrated optical communication networks in which communication signals are transmitted and switched optically without any intermediate conversion of the transmitted signals.

2. Description of the prior art

The ATM (Asynchronous Transfer Mode) and STM (Synchronous Transfer Mode) information transfer techniques are well known and existing BISDN (Broadband Integrated Services Digital Networks) currently use one of these techniques.

When the STM technique is used the communicating transmitter and receiver are connected for the duration of the call by a circuit comprising one or more time-division buses made up of a succession of cyclic time-division multiplexes which usually have a frame structure. Time-division switching centers carry out the necessary space-division and time-division switching of the various multiplexes used by the circuit according to a cyclic procedure using control data stored for the duration of the call in control devices of the switches in each center. The information to be transmitted is formatted at the source into fixed format samples transmitted successively on the time division buses assigned to the call.

Many synchronous time-division switching devices have been described, in particular "controlled propagation" time-division switches using delay lines to rearrange the signals in time. French patent 2 119 152 of 22 Dec. 1970 describes switches of this kind and indicates that the delay lines may be implemented by means of optical fibers. An experimental optical propagation time-division switch has been produced by ATT Bell-Labs and is described in the article by R. A. Thomson and P. P. Giordano "Experimental Photonic Time-Slot Interchanger Using Optical Fibers as Re-Entrant Delay Line Memories", OFCC, 02/86. This switch uses optical fibers and electrically controlled directional couplers.

The ATM technique combines and adapts the time-division multiplex transmission and packet transmission techniques: the communicating transmitters and receivers are connected for the duration of the call by a virtual circuit which is allocated a physical path made up of a succession of time-division multiplex lines and switching centers. The time-division resources are assigned statistically from a pool of sources to which no specific bus is allocated on the lines. A source or a receiver may be involved in a multiplicity of different simultaneous calls to different destinations.

The information to be transmitted is formatted at the source into fixed format cells each comprising identification and routing information; the cells are transmitted acyclically on time-division multiplex lines which do not have a frame structure, according to the availability of non-dedicated transmission channels.

The switching of the cells is therefore similar to time-division switching, involving space-division switching and rearrangement in time. As the multiplexing mode is a statistical one, however, the time rearrangement resources are themselves used statistically and are therefore managed like queues. To switch a cell the identification and routing information it contains must first be analyzed.

ATM switching systems have been described, for example in French patent 2 538 976 of 29 Dec. 1982, covering a synchronous fixed length packet switching system. These known systems use optical transmission means to connect the users and to interconnect the switching centers and electronic means to switch the signals. Opto-electrical and electro-optical conversion of the signals are therefore carried out at the boundaries of the transmission means and the switching means, and the signals are demodulated in the switching means in order to consult the routing information. These conversion and analysis means complicate the structure of the system, compromise its reliability and increase its cost.

New communication techniques based on optical spectral multiplexing are known: optical transmitters and receivers are connected to a passive propagation medium which divides equally between the receivers the energy produced by each transmitter. The transmitters and the receivers can be tuned to a multiplicity of optical frequencies each of which constitutes a transmission channel for one communication direction. There are three main operating modes:

each transmitter is locked permanently to an allocated frequency, the call being set up by tuning the communicating receiver to said frequency, or each receiver is locked permanently to an allocated frequency, the call being set up by tuning the communicating transmitter to said frequency, or the frequency is allocated to a call when it is set up, the communicating transmitter and receiver being tuned to said frequency.

Frequency-domain switching systems of this kind have been described in the following patents:

EP 77 292 published 20 Apr. 1983 covering a communication network using monomode fibers as transmission means for optical buses multiplexed in the optical carrier frequency domain, FR 2 586 874 of 29 Aug. 1985 covering an optical fiber telecommunication device, and FR 2 593 654 of 28 Jan. 1986 covering a coherent photonic telecommunications device.

These systems do not operate in spectro-time-division mode. The optical frequencies used to convey the call are, in the best case, mobilized for the duration of the call.

Multiservice operation, whereby multiple calls to different destinations can be set up from the same terminal, is possible only if the terminals are each equipped with a multiplicity of transmit and receive devices. Each call set up mobilizes one or two optical frequencies.

From what is known of ATM systems, optical systems using frequency-domain multiplexing only would seem not to be well suited to multiservice operation.

Finally, use of a wavelength switching optoelectronic device instead of an electronic space-division switch to carry out the switching function between the input buffer memories (FIFO) and output buffer memories (Elastic Buffer) of a high-speed packet switch with N optical input lines and N optical output lines has been described in the article by M. S. Goodman et al of Bell Communications Research "Demonstration of Fast Wavelength Tuning For a High Performance Packet Switch", Conferences on Optical Communication, 11–15/09/88—Brighton UK, pages 255 through 258, IEE.

In this fast packet switch:
- the N input buffers and the N output buffers are electronic memories,
- the former are each electrically connected by an input device to the receiver of an optical input line and by an output device to a wavelength tunable laser,
- the latter are each electrically connected by an input device to an opto-electronic receiver tuned to a particular optical wavelength and by an output device to the transmitter of an optical output line,
- the N tunable lasers, each connected to one input buffer memory, and the N wavelength tuned opto-electronic receivers, each connected to one output buffer memory, are optically connected to an N×N passive optical star coupler,
- a packet is transferred between an input buffer memory and an output buffer memory by tuning the laser connected to the output of the input buffer memory to the wavelength to which is tuned the opto-electronic receiver connected to the input of the output buffer memory which is the destination for the duration of packet transmission.

In this fast packet switch:
- the signals to be transmitted undergo various conversions during the switching operations, including opto-electrical and electro-optical conversion (demodulation and remodulation of the optical signals), deserialization and serialization of the electrical signals,
- routing the packets requires use of routing information included in the packets themselves and therefore demodulation of the carrier signal,
- the optical communication system including the transmitters, distributor and receivers is confined to a restricted space, and
- the capacity of the switching means is limited by the number of wavelengths that can be discriminated, each wavelength being assigned to one receiver.

An object of the invention is to provide a broadband multiservice optical communication system in which signals are transmitted and switched end to end by optical means only without requiring successive multiple opto-electrical and electro-optical conversion or modulation and demodulation of said signals.

Another object of the invention is to provide a multiservice optical communication system in which a terminal can by means of the same optical transmitter and/or the same optical receiver set up a multiplicity of simultaneous calls having different destinations or sources.

Another object of the invention is to provide a multiservice optical communication system in which the use of optical wavelengths or frequencies is optimized to increase the system capacity in terms of terminal connections.

Another object of the invention is an asynchronous time-division multiplex optical communication system which does not require any analysis of the information transferred other than what is directly allowed by the optical and opto-electronic means alone without previous demodulation or conversion of the optical communication signals.

Another object of the invention is to space-division and time-division switch optical signals carrying information using optical and opto-electronic means controlled by optical signals.

SUMMARY OF THE INVENTION

The invention consists in a asynchronous time-division multiplex optical communication system comprising: a switching network, q user receiver circuits connected by at most q optical user receiver lines to the switching network, p user transmitter circuits each connected to the switching network by an optical user transmitter line, said user transmitter circuits and user receiver circuits being divided between: x remote communication terminals each having a user transmitter circuit and a user receiver circuit, y transmit terminals each having a user transmitter circuit, z receive terminals each having a user receiver circuit;

wherein each user receiver circuit comprises:
- at least one optical control receiver tuned to an optical frequency from a first group of optical frequencies of a first set of optical frequencies;
- an optical transmission receiver which can be tuned to any optical frequency of a second group of optical frequencies of said first set of optical frequencies;
- optical frequency tuning means for said optical transmission receiver;
- and means for temporal synchronization of the received information;

each user transmitter circuit comprises:
- an optical transmission transmitter that can be tuned to any optical frequency of said second group of optical frequencies;
- optical frequency tuning means for said optical transmitter;
- and temporal synchronization and phase alignment means for the information to be transmitted;

the switching network comprises:
- an optical spectro-time-division switching network;
- a control processor unit;
- and a clock unit;

the specto-time-division switching network is connected optically to the optical transmitter lines and to the optical receiver lines;

the control processor unit comprises:
- at least one control transmitter circuit having an optical control transmitter tuned to an optical frequency of said first group of optical frequencies;
- at least one signalling transmitter having an optical transmission transmitter that can be tuned to any optical frequency of said second group of optical frequencies;
- at least one control receiver circuit and at least one signalling receiver each having at least one optical control receiver tuned to an optical frequency of said first group of optical frequencies and an optical transmission receiver which can be tuned to any optical frequency of said second group of optical frequencies;

said control processor unit is connected to the spectro-time-division switching network by:
- a control bus;
- at least one optical control transmitter line, each of which is connected optically to the optical control transmitter of a control transmitter circuit;
- at least one optical control receiver line, each of which is connected optically to the optical control and transmission receivers of a control receiver circuit;

and at least one optical signalling transmitter line, each of which is connected optically to the optical transmitter of a signalling transmitter;

at least one optical signalling receiver line, each of which is connected optically to the optical control and transmission receivers of a signalling receiver;

and the clock unit is connected by a first synchronization line to the spectro-time-division switching network and by a second synchronization line to the control processor unit.

In a first embodiment, the spectro-time-division switch comprises:

an optical line scanner connected optically to the optical user transmitter lines and to the optical signalling transmitter lines, said optical transmitter lines each carrying a transmit spectro-time-division multiplex comprising time slots each carrying an optical information sample;

an optical command distributor;

a control circuit connected optically:
to the optical line scanner by a first optical line carrying a output label multiplex comprising as many time slots as there are transmitter lines;
to the optical command distributor by a second optical line carrying a control label multiplex having a number of time slots equal to that of said output label multiplex, each time slot of the control label multiplex being in phase temporally with a same ranked time slot of said output label multiplex and carrying a command;
and to the synchronization generator by the first synchronization line:

and connected to the control processor unit by a control bus;

n controlled propagation optical time-division switching units each connected optically to an output of the optical line scanner and to an output of the optical command distributor;

an optical distributor connected optically to the output of the time-division switching units and to the optical control transmitter lines and having outputs each connected optically to the input of an optical filter;

s optical wavelength filters each connected optically to the output of an optical user receiver line, signalling receiver line, control receiver line;

a filter control circuit connected to the input of the control bus and to the output of a control input of each optical wavelength filter.

In a second embodiment the spectro-time-division switch comprises:

a line scanner connected optically to the optical user transmitter lines and to the optical signalling transmitter lines, said optical transmitter lines each carrying a transmit spectro-time-division multiplex comprising time slots each carrying an optical information sample;

an optical command distributor;

a control circuit connected optically to the optical line scanner by a first optical line carrying an output label multiplex comprising as many time slots as there are transmitter lines; to the optical command distributor by a second optical line carrying a control label multiplex having the same number of time slots as said output label multiplex, each time slot of the control label multiplex being in phase with a same ranked time slot of said output label multiplex and carrying a command; and to the clock unit by the first synchronization line; and further connected to the control processor unit by the command bus;

controlled propagation optical multiple time-division switching units having:
n delay unit input circuits each connected optically to an output of the line scanner and to an output of the optical command distributor;
and a delay unit output circuit connected optically at its input to the input circuits;

an optical distributor connected optically to the output of the delay unit output circuit and to the optical control transmitter lines and having outputs each connected optically to the input of an optical filter;

s optical wavelength filters each connected optically at its output to one of the optical user receiver lines, signalling receiver lines, control receiver lines;

a filter control circuit connected by its input to the control bus and by its output to a control input of each optical filter.

According to another characteristic of the invention:

each time slot of the control label multiplex having the same rank as a transmitter line carries a command comprising an optical signal at an optical frequency from a second set of optical frequencies in which each optical frequency characterizes a real time propagation delay to be applied in a time-division switching unit to the message carried by the time slot of said transmitter line; said optical frequency being determined by the control circuit;

and the optical command distributor supplies to each time-division switching unit, corresponding to the rank of a time slot of the control label multiplex, the command carried by said time slot of the control label multiplex.

The communication system in accordance with the invention uses various multiplexes:

a frame structure control transmitter multiplex CEM in which:
the optical carrier frequency from a first group Fa1 is used as a reference for the optical frequency-domain encoding systems of the terminals,
the frame code is used as a time reference for temporal synchronization of the terminals, and
the other time slots are used to transmit terminal control messages, a control receiver multiplex CRM which does not have a frame structure carrying optical samples with an optical carrier frequency from a second group Fa2 carries response messages from the terminals during control operations, a signalling transmitter spectro-time-division multiplex SEM and a signalling receiver multiplex SRM are used to exchange signalling between the terminals and the switching network control processor unit, a multiplicity of user transmitter spectro-time-division multiplexes UEM and a multiplicity of user receiver time-division multiplexes URM; the multiplexes SEM, SRM, UEM and URM carry optical samples each with an optical carrier frequency from the second group Fa2.

The communication system uses for control purposes:
a output label multiplex OLM, and
a control label multiplex CLM; the multiplexes OLM and CLM are frame structured time-division multiplexes having a period equal to the duration of a time slot of the communication multiplexes and a number of time slots per frame equal at least to the total number of lines UEL and SEL connected to the spectro-time-division switching network SSTSN.

The optical samples carries by the various multiplexes have a duration T and are in the form of a central part containing the transmitted information on either side of which is a part which does not carry information, these latter parts constituting switching windows.

The relative durations of the three parts are such that it is not necessary prior to switching to achieve perfect temporal alignment of the samples relative to the local clocks of the switching device in order to avoid corruption of the transmitted information.

The transmitted information is either a digital signal or an analog signal: in the former case the signal is formatted in cells each containing a multiplicity of octets (bytes) and in the latter case the signal is subdivided temporally into samples.

Each signal cell or sample is transmitted by an optical sample encoded at the optical frequency characterizing the destination of the signal which constitutes the switching reference for the switching means of the switching network and which constitutes the selection reference for the receive means of the terminals. The control circuit CC comprises a multiplicity of time-division switching unit TSU command generators each responsible for managing the time slots of one of the multiplexes CRM, SRM and URM and for producing time-division switching unit TSU commands for all the optical samples to be switched onto these multiplexes irrespective of their origin.

The number of generators is at least equal to the number of multiplexes CRM, SRM and URM used in the system, equal to the number f2 of optical frequencies from the second group Fa2 of optical frequencies and at most equal to the number of optical frequencies that can be discriminated in the optical spectrum.

A preferred embodiment of the invention will now be described in more detail and by way of non-limiting example only with reference to the appended diagrammatic drawings.

BRIEF DESCRIPTION OF THE DRAWINGS

FIGS. 2A, 2B, 3A, 3B, 4A, 4B, 4C, 4D, 4E, 5A, 5B, 5C and 5D are schematics of various circuits constituting a first embodiment of the spectro-time-division switching network, as follows:

FIG. 2A—an input line scanner circuit;
FIG. 2B—a time-division switching unit command distributor circuit;
FIG. 3A—a circuit combining the input line scanner and the time-division switching unit command distributor;
FIG. 3B—an alternative circuit combining the input line scanner and the time-division switching unit command distributor;
FIG. 4A—a circuit generating commands for the input line scanner and time-division switching unit command distributor circuits respectively shown in FIGS. 2A and 2B;
FIG. 4B—a circuit generating commands for the circuit combining the scanner and the distributor shown in FIG. 3A or 3B;
FIG. 4C—a time-division switching unit control label multiplex generator;
FIG. 4D—one embodiment of a spectral demultiplexer;
FIG. 4E—a time-division switching unit command generator circuit;
FIG. 5A—a time-division switching unit;
FIG. 5B—a time-division switching unit crosspoint;
FIG. 5C—a different embodiment of the time-division switching unit using a k×1 coupler;
FIG. 5D—a different embodiment of the time-division switching unit using k 2×1 couplers.

FIG. 8A—a delay unit input circuit;
FIG. 8B—a different delay unit input circuit;
FIG. 9A—an optical multiple input delay line OMIDL;
FIG. 9B—an optical multiple input delay circuit.

DESCRIPTION OF THE PREFERRED EMBODIMENT

Figure 1A:
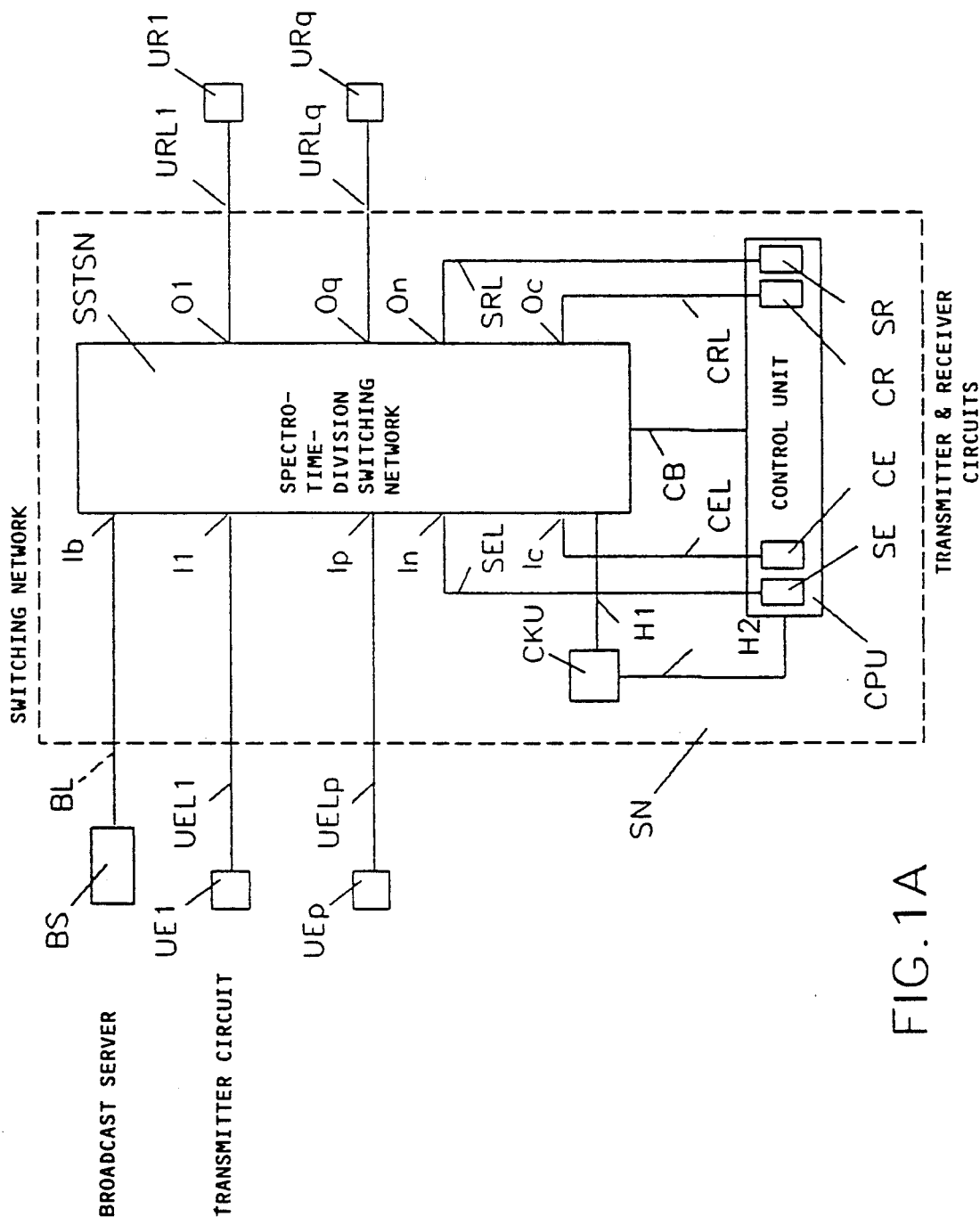
FIG. 1A is a schematic showing one embodiment of a communication system in accordance with the invention.

FIG. 1A shows a preferred embodiment of the communication system in accordance with the invention employing at least one switching network SN to which are connected:

p user transmitter circuits UE (UE1 to through UEp) each having an optical transmission transmitter connected to said optical user transmitter line of the terminal, means for tuning the optical frequency of said optical transmitter, transmit information source means and information time synchronization and phase alignment means, each circuit being connected by an optical user transmitter line UEL (UEL1 through UELp);

q user receiver circuits UR (UR1 through URq) each having an optical transmission receiver and at least one optical control receiver connected to said optical user receiver line, means for tuning the optical frequency of said optical transmission receiver, time synchronization means and received information processing means, each circuit being connected by an optical user receiver line URL (URL1 through URLq);

and possibly further includes one or more broadcast servers BS for broadcasting audiovisual presentations, for example, and each connected by an optical broadcasting line BL.

Said user transmitter circuits UE and user receiver circuits UR are divided between:

x communication terminals each having a user transmitter circuit UE and a user receiver circuit UR, each connected by an optical user transmitter line UEL and an optical user receiver line URL, y transmit terminals each having a user transmitter circuit UE, each connected by an optical user transmitter line UEL, z receive terminals each having a user receiver circuit UR, each connected by an optical user receiver line URL.

The numbers p and q of transmitter and receiver circuits are such that:

$$p = x + y \quad q = x + z$$

Several broadcast servers BS and/or several transmit terminals may be grouped together in server centers. The receive terminals are generally installed on the premises of users or at data acquisition server centers. The communication terminals are installed on the premises of users, in switching networks connected to the switching network SN and in the server centers enabling interactive access to them by the switching network for management of operation and possibly by users for management of services.

In addition to said transmitter and receiver circuits, each communication terminal includes various other functional devices including:
- a synchronizable clock signal generator,
- an optical frequency reference unit, and
- a control processor unit supervising the various other functional units.

The transmit and/or receive terminals grouped together in a common server center and the receive terminals located on the premises of users are managed by said other functional units of the communication terminal installed at the server center or on the premises of the user.

The optical user transmitter and receiver lines UEL and URL connecting the same communication terminal are each supported by a respective optical fiber or use a common optical fiber equipped at its ends with optical directional couplers for splitting/combining the two transmission directions associated with optical isolating means.

One optical fiber supports only one optical transmitter line UEL.

One optical fiber can support several optical user receiver lines URL, in which case the end of the fiber remote from the switching network is fitted with an optical distributor device such as an optical star coupler, for example.

The optical broadcasting lines BL connecting the servers BS of the same server center are each supported by a respective optical fiber or combined by means of an optical coupler in the server center on a common server center connection optical fiber.

The switching network SN comprises:
a spectro-time-division switching network SSTSN which has:
two groups of inputs with respective capacities n and m:
a first group of n inputs I1 through In, of which p inputs are each connected optically to one optical user transmitter line UEL and of which at least one of the remaining n−p inputs (In, for example) is connected to an optical signalling transmitter line SEL;

a second group of m inputs of which m1 inputs (the input Ib, for example) are each connected to an optical fiber supporting one or more broadcasting lines BL each connecting a broadcast server BS, and at least one of the remaining $m2 = (m - m1)$ inputs (the input Ic, for example) is connected to an optical control transmitter line CEL;

a group of s identical optical outputs comprising:
q outputs (O1 through Oq) each of which is usually connected to an optical user receiver line URL;
at least one output (the output On, for example) connected to an optical signalling receiver line SRL;
at least one output (the output Oc, for example) connected to an optical control receiver line CRL;
a synchronization port connected to a synchronization line H1;
a control port connected to a control bus CB;
a control processor unit CPU which has:
at least one control transmitter circuit CE including an optical control transmitter connected to an optical control transmitter line CEL;
at least one control receiver circuit CR comprising an optical transmission receiver and at least one optical control receiver connected to an optical control receiver line CRL;
at least one signalling transmitter SE comprising an optical signalling transmitter connected to an optical signalling transmitter line SEL;
at least one signalling receiver circuit SR comprising a signalling receiver and at least one control receiver connected to an optical signalling receiver line SRL;
a clock unit CKU connected:
to the switching network SSTSN by the synchronization line H1;
to the control processor unit CPU by a synchronization line H2.

The control processor unit CPU is connected:
to the switching network SSTSN by said optical control and signalling transmitter and receiver lines (CEL, CRL; SEL, SRL) and by the control bus CB;
to the clock unit CKU by the synchronization line H2.

If one optical fiber supports several optical user receiver lines URL the fiber is connected to a single output Oi of the switching network SSTSN.

Each optical control transmitter is tuned to an optical frequency in a first group Fa1 of optical frequencies comprising f1 optical frequencies belonging to a first set Fa of optical frequencies which comprises all the optical transmission frequencies of the system in accordance with the invention and, according to its rank, each optical control receiver is tuned to an optical frequency from said first group of optical frequencies.

Said optical transmitters and receivers can be tuned to any optical frequency in a second group Fa2 of optical frequencies from the set Fa comprising f2 optical frequencies different from the optical frequencies in the first group Fa1 of optical frequencies.

Each optical broadcasting line BL of a broadcast server BS is connected in the server BS to at least one broadcast optical transmitter, the user receiver circuits UR comprising if appropriate one or more optical broadcast receivers.

Said optical broadcast transmitters and receivers can be tuned to any optical frequency in a third group Fa3 of optical frequencies from the set Fa comprising f3 optical frequencies different from the optical frequencies of the first and second groups Fa1 and Fa2 of optical frequencies.

In an alternative embodiment of the invention each user receiver circuit UR comprises at least one optical receiver which can be tuned to any optical frequency from the three groups Fa1, Fa2, Fa3 of optical frequencies forming the first set Fa of optical frequencies. Said first set of optical frequencies Fa, comprising all the optical transmission frequencies of the system in accordance with the invention, therefore comprises the three groups Fa1, Fa2 and Fa3 of optical frequencies respectively comprising f1, f2 and f3 different optical frequencies.

The number fa of optical frequencies in the first set Fa of optical frequencies is equal to the sum of the numbers of optical frequencies in each group:

$$fa = f1 + f2 + f3$$

The word "frequency" is used in this description for convenience: it denotes a narrow band of optical frequencies centered on an optical frequency which can be discriminated either by means of an optical filter device or by means of an opto-electronic filter device known as a heterodyne photoreceiver.

The maximum number $fa_{max}$ of optical frequencies of said first set Fa of optical frequencies is equal to the maximum number $f_{max}$ of optical frequencies that can be discriminated in an optical spectrum by such devices.

$$fa \leq fa_{max} = f_{max}$$

Each optical transmitter transmits a time-division multiplex on the line connected to it. Each optical receiver receives at least one time-division multiplex on the line to which it is connected. Except for the CEM multiplexes to be described later, these time-division multiplexes comprise a sequence of identical time slots of duration T with no frame structure. For convenience the following description assumes that each time slot of a sequence of identical time slots can be identified by a time reference Ti relative to the communication system clock.

The CEM multiplexes are frame structured multiplexes in which the frame comprises c time slots and has a period c.T.

The first time slot of each frame carries a frame start identification code, as is known in the time-division switching art. The other time slots are identical and therefore identical to the time slots of the other multiplexes.

Each time slot Ti transmits an optical sample of duration T embodying information to be transmitted. The optical carrier frequency of each sample characterizes its functional or physical destination: the samples are encoded by the transmit circuit at an optical frequency depending on their physical or functional destination.

The information to be transmitted may be a digital signal or an analog signal: in the former case the signal is formatted into cells each containing a multiplicity (for example 36 or 53) bytes; in the latter case the signal is sampled.

Each signal cell or sample is transmitted by an optical sample encoded at an optical frequency characterizing the destination of the signal. The optical carrier frequency of a sample provides a switching reference for the routing means of the switching network and a selection reference for the receive means of the terminal.

In the preferred embodiment of the invention each optical sample of duration T comprises a central part containing the transmitted information preceded and followed by parts which do not carry information and which form switching windows. The relative durations of the three parts are such that there is no need prior to switching to align the samples perfectly with the local clocks of the switching device with a view to preventing corruption of the transmitted information.

When all the optical samples in a multiplex have the same optical carrier frequency, the multiplex is referred to hereinafter as a time-division multiplex. When the successive optical samples in a multiplex can have different optical carrier frequencies, the multiplex is referred to hereinafter as a spectro-time-division multiplex.

Each control transmitter circuit CE transmits on the control transmitter line CEL a control transmitter multiplex CEM. The CEM multiplexes have a frame structure whatever the operating mode of the communication system. They are all systematically distributed by the switching network SSTSN to each of the lines CRL, SRL and URL and received by said optical control receivers of the receive circuits connected to said lines. Each time-division multiplex CEM has an optical carrier frequency which is one of the f1 optical frequencies from the group Fa1 and which characterizes the rank of the multiplex in the set of CEM multiplexes. The optical frequencies of the group Fa1 functionally characterize the control function.

Each signalling transmitter circuit SE transmits on the signalling transmitter line SEL a signalling transmitter multiplex SEM. Each user transmitter circuit UE transmits on the user transmitter line UEL a user transmitter multiplex UEM. The multiplexes SEM and UEM carry a succession of optical samples at one of the f2 optical carrier frequencies from the group Fa2 of optical frequencies, according to its destination. The optical frequencies of the group Fa2 functionally characterize the switching function, including the signalling function.

Each control receiver line CRL carries a control receiver multiplex CRM. Each signalling receiver line SRL carries a signalling receiver multiplex SRM. Each active user receiver line URL carries a user receiver multiplex URM.

The time-division multiplexes CRM, SRM and URM are each at an optical carrier frequency which is one of the f2 optical frequencies from the group Fa2 of optical frequencies. For the switching means this optical frequency characterizes the rank of the multiplex in the set of multiplexes CRM, SRM and URM and therefore characterizes a spatial destination in the communication system which is not necessarily time invariant, as explained in the description of how the communication system operates.

The time-division multiplexes CRM, SRM and URM are transmitted optically by the switching network SSTSN on the lines CRL, SRL and URL and received optically by said receivers of the receive circuits connected to said lines.

Each broadcasting line BL carries at least one broadcasting multiplex BCM; each broadcasting multiplex BCM is at an optical carrier frequency which is one of the f2 optical frequencies from the group Fa3. This optical frequency characterizes the rank of the broadcasting multiplex BCM in the set of broadcasting multiplexes BCM. For the routing means of the switching network and the receive circuits of the terminal this optical frequency is the broadcasting multiplex BCM selection parameter.

The optical frequencies of the group Fa3 functionally characterize the broadcast function. The broadcasting multiplexes BCM are distributed, possibly in a selective way, to the user receiver lines URL by the switching network SSTSN and received by said optical broadcast receivers of the receive circuits connected to these lines.

In the most usual application of the invention an active user receiver line URL carries a user receiver multiplex URM, all the control transmitter multiplexes CEM and where applicable all the broadcasting multiplexes BCM, each control receiver line CRL carries a control receiver multiplex CRM and the control transmitter multiplexes CEM and each signalling receiver line SRL carries a signalling receiver multiplex SRM and the control transmitter multiplexes CEM.

In the switching network in accordance with the invention the switching network SSTSN:

distributes each sample of the signalling and user transmitter spectro-time-division multiplexes SEM and UEM, according to their optical carrier frequency Fa2i, to the control, signalling or user receiver time-division multiplex CRM, SRM or URM with the carrier frequency Fa2i;

distributes to each of the control and signalling lines CRL and SRL the control transmitter multiplexes CEM and to each of the user receiver lines URL, in addition to the user receiver multiplexes URM, the control transmitter multiplexes CEM and, possibly selectively, the broadcasting multiplexes BCM.

If $f_{max}$ denotes the maximum number of optical frequencies that can be discriminated in an optical spectrum, assuming that the switching network SN serves only communication terminals and uses only one line of each type CRL, CEL, SEL and SRL, which assumptions are expressed by the equations:

$$y=z=0; p=q=x$$

$$f1=1; f3=0; f2=f_{max}-1$$

then the maximum number $x_{max}$ of communication terminals that can be connected to the switching network node is:

$$x_{max}=f_{max}-3$$

The maximum number $E_{max}$ of transmitter spectro-time-division multiplexes (SEM, UEM) used is:

$$E_{max}=f_{max}-2$$

The maximum number $R_{max}$ of receiver multiplexes (CRM, SRM, URM) to be managed by the switching network SSTSN is:

$$R_{max}=f_{max}-1$$

Figure 1B:
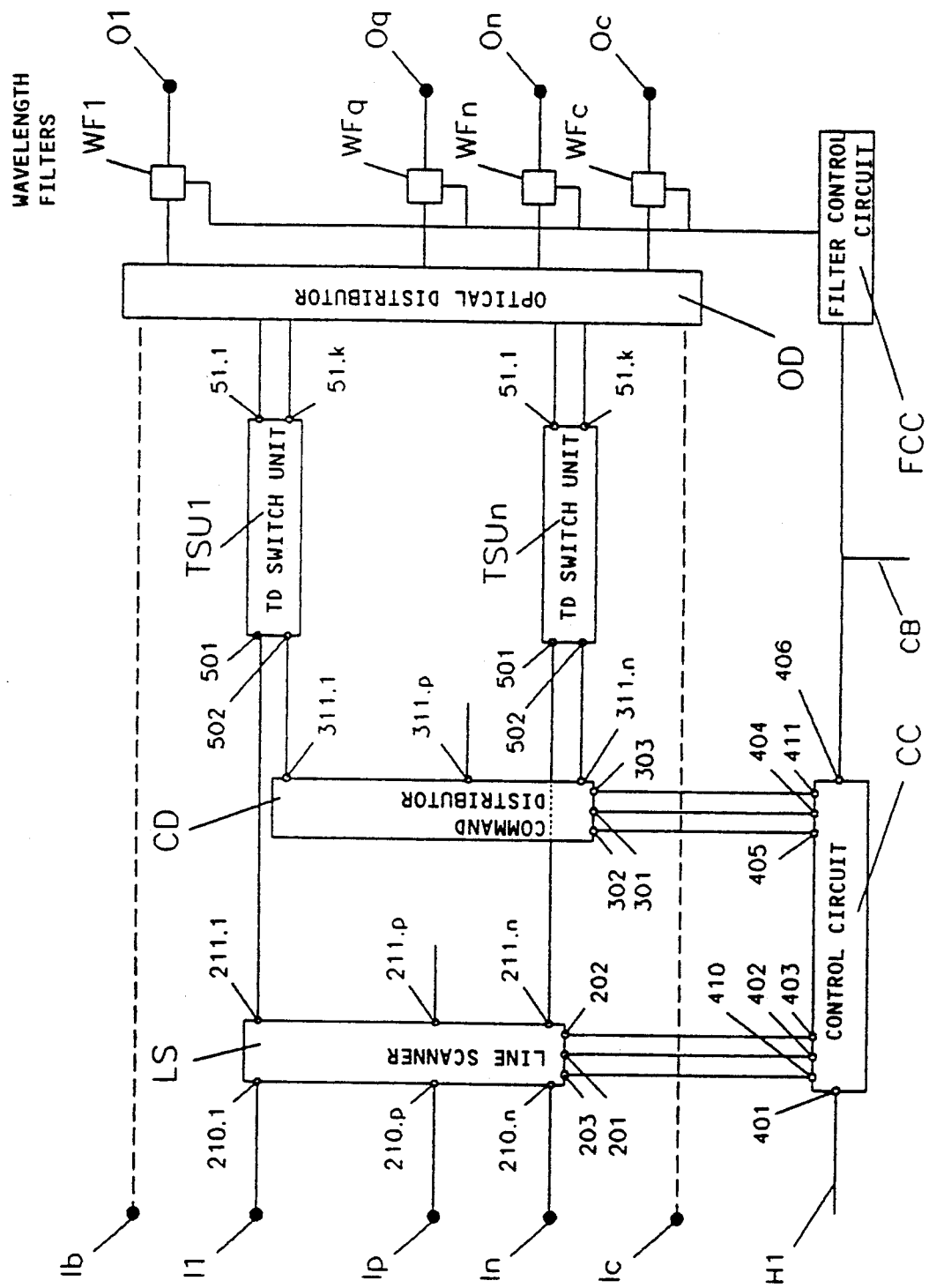
FIG. 1B is a schematic showing a first embodiment of the spectro-time-division switching network of this embodiment of the communication system in accordance with the invention.

FIG. 1B shows the organisation of the switching network SSTSN of the spectro-time-division switching system in accordance with the invention, in which figure:

I1 through In, Ib and Ic denote optical inputs,

O1 through Oq, On and Oc denote optical outputs,

H1 and CB respectively denote the synchronization line and the control bus of the switching network SSTSN, and LS denotes an optical input line scanner circuit which scans the input lines carrying the transmitter spectro-time-division multiplexes UEM and SEM. The circuit LS is optically connected:

by its inputs 210.1 through 210.n to the inputs I1 through In, by each of its outputs 211.1 to 211.n to the input 501 of an optical time-division switching unit TSU, and by its control input and output 201 and 202 and its output 203 respectively to the output 402 and to the inputs 403 and 410 of a control circuit CC.

The line scanner LS samples the contemporaneous optical samples of the user and signalling transmitter multiplexes UEM and SEM from the inputs I1 through In of the switching network SSTSN and present at its inputs 210.1 through 210.n, groups the resulting optical signals together in a cyclic output label spectro-time-division multiplex OLM which is obtained at the output 203, and transfers to its outputs 211.1 through 211.n the optical samples received on its inputs.

The output label multiplex OLM has a payload (usable capacity) of n channels each associated with one of the inputs 210.1 through 210.n and therefore with one of the inputs I1 through In of the switching network SSTSN. Its cycle time is equal to the duration T of a time slot of the multiplexes on the lines connected to the inputs I1 through In. The spectral characteristics of the optical signals that it carries are similar to those of the optical samples present at the inputs I1 through In from which they originate and therefore represent the destinations of said optical samples. Each has an optical carrier frequency from the second group Fa2 of optical frequencies.

The control circuit CC is the control circuit of the switching network SSTSN. It is optically connected:

by its ports 402, 403 and 410 to the line scanner LS as described above, by its outputs 404 and 411 and its input 405 respectively to the control inputs 301 and 303 and the control output 302 of a command distributor CD, by its port 401 to the synchronization line H1, and by its port 406 to the control bus CB.

The control circuit CC analyzes optically the signals of the output label multiplex OLM received at the input 410, generates the commands for the time-division switching units TSU according to the availability of the destination lines for the samples present at the inputs I1 through In of the switching network SSTSN, designated by the spectral characteristics of the output label multiplex OLM signals, and transmits these commands to the command distributor CD over a cyclic control label spectro-time-division multiplex CLM from the output 411, the control label multiplex CLM having the same payload (number n of usable channels) and the same cycle time as the output label multiplex OLM.

Each time slot of the control label multiplex CLM is synchronized, ignoring the computation time, to the same ranked time slot of the output label multiplex OLM and carries successive commands for the same ranked time-division switching unit TSU.

The commands are generated and transmitted in the form of optical signals each of which has an optical carrier frequency which is one of the fb optical frequencies of a second set Fb of optical frequencies which control the time-division switching unit TSU. The second set Fb of optical frequencies is independent of the first set Fa of optical frequencies and may be in the same spectral domain. Each of the Fb optical frequencies of the second set Fb of optical frequencies characterizes a specific value of the time offset to be applied in the switching network SSTSN to any incident sample of a transmit spectro-time-division multiplex to be inserted into a free time slot or an allocated time slot of the destination receive time-division multiplex, in other words to a value of the time for the sample to pass through a time-division switching unit TSU.

Figure 5A:
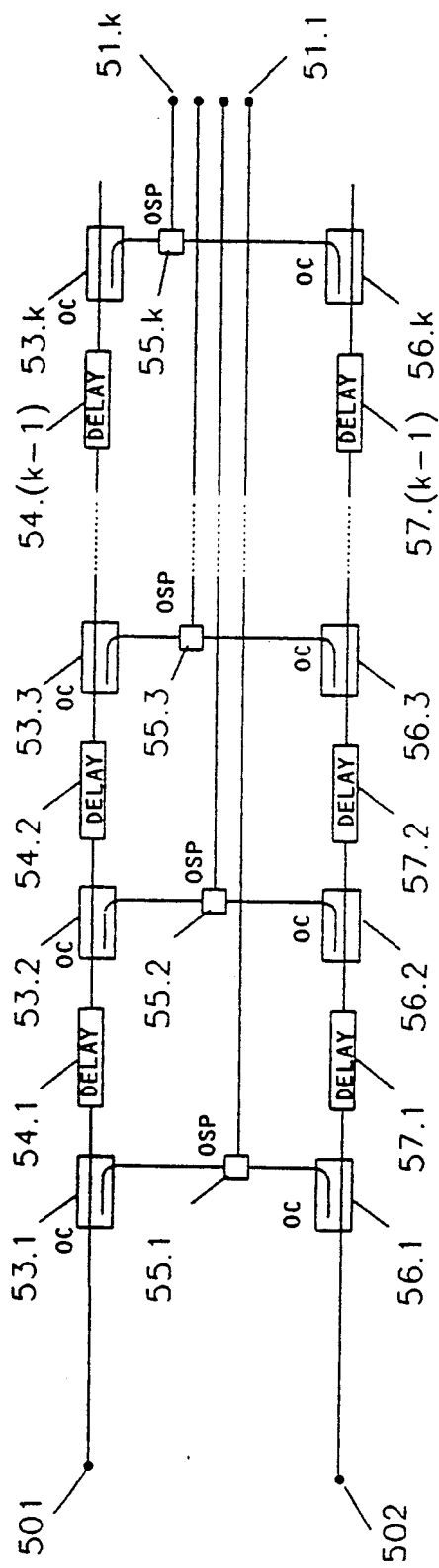
Figure 5B:
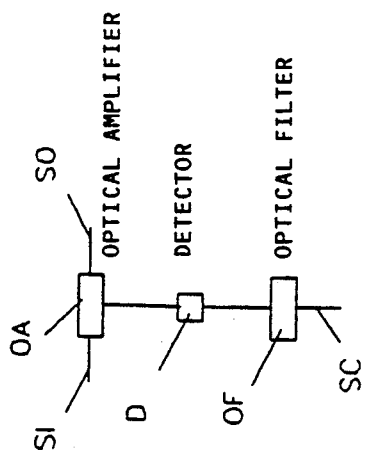
Figure 5C:
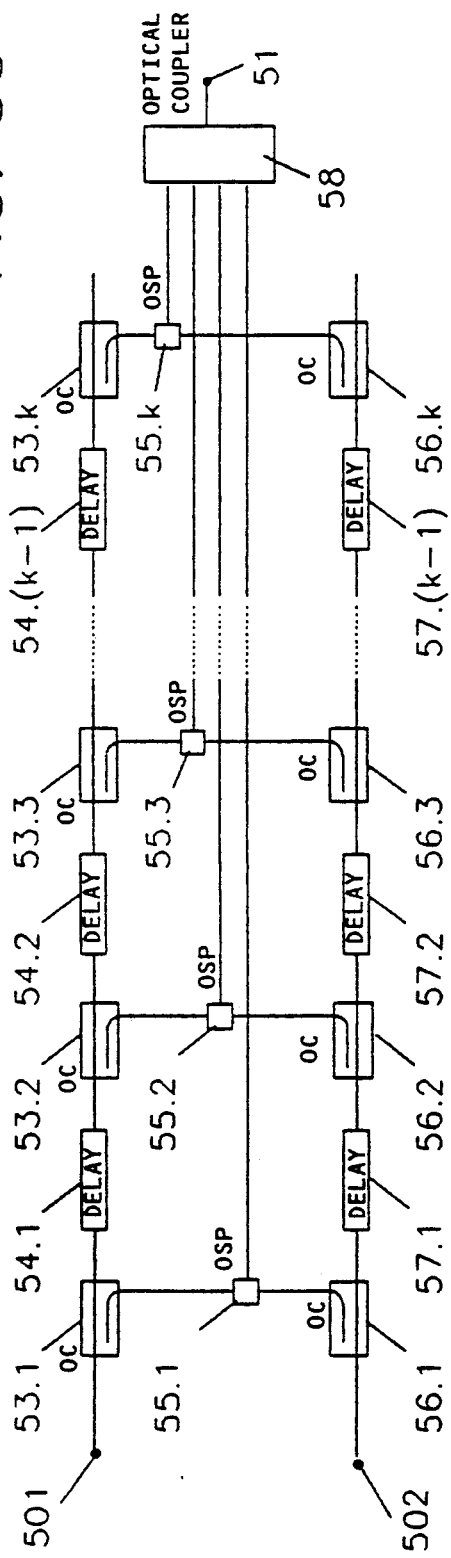
Figure 5D:
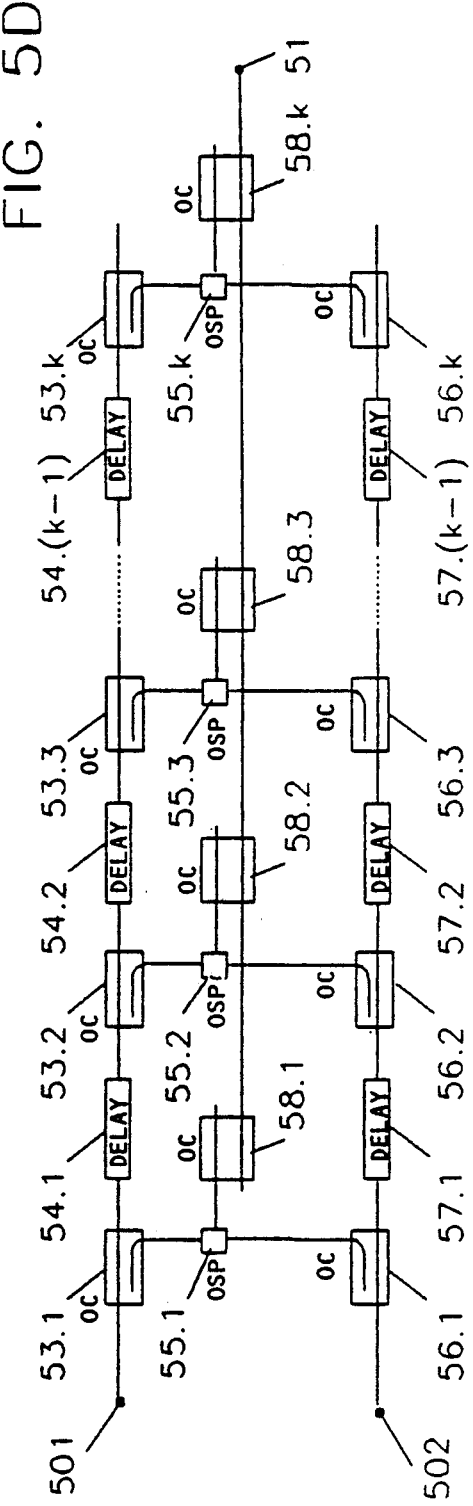

In the embodiment of the time-division switching unit TSU shown in FIG. 5A, 5C or 5D, in which the samples are rearranged in time by means of a multiple output delay line with each output connected to one crosspoint, each of the fb optical frequencies is both the address of an optical crosspoint in the set of optical crosspoints of the same time-division switching unit TSU and the command for said optical crosspoint.

CD is an optical command distributor circuit which distributes commands to the time-division switching units TSU1 through TSUn. These commands are the optical signals carried by the control label multiplex CLM received at the input 303. The command distributor CD is connected optically by its control input and output 301 and 302 and the input 303 respectively to the ports 404, 405 and 411 of the control circuit CC and by its outputs 311.1 through 311.n to the control inputs 502 of the time-division switching units TSU. The command distributor CD routes to each of the outputs 311.1 through 311.n the commands carried by the control label multiplex CLM according to their rank in the frame of the multiplex, the succession of the same ranked commands in successive frames of the control label multiplex CLM constituting the control label multiplex of the same ranked time-division switching unit TSU.

TSU1 through TSUn are n "controlled propagation" optical time-division switching units each connected:
- by the input 501 to the same ranked output of the group of outputs 211.1 through 211.n of the line scanner LS,
- by the control input 502 to the same ranked output of the group of outputs 311.1 through 311.n of the command distributor CD, and
- by each of the outputs 51.1 through 51.k if the time-division switching units are of the type shown in FIG. 5A or by the output 51 if the time-division switching units are of the type shown in FIG. 5C or FIG. 5D to an input of the optical distributor OD.

Each time-division switching unit TSU receives at its input 501 a user or signalling transmitter time-division multiplex UEM or SEM and at its control input 502 a control label multiplex CLM in which each command concerns the contemporaneous optical sample of the transmit multiplex and, according to the commands received, carries out the rearrangement in time of the successive optical samples of the input time-division multiplex.

OD is an optical distributor which has:
- (m+(n.k)) inputs connected to the m inputs of the second group of inputs of the switching network SSTSN and to the k outputs of each of the n time-division switching units TSU if the latter are of the type shown in FIG. 5A, or
- (m+n) inputs if the time-division switching units TSU are of the type shown in FIG. 5C or 5D, and
- s outputs each connected to the input of an optical wavelength filter of a set of s filters WF comprising the filters WF1 through WFq, WFn and WFc from FIG. 1B.

The optical distributor OD spectrally multiplexes all the optical signals presented to its inputs and delivers on each of its outputs a spectral multiplex of all the incoming samples. One embodiment of an optical distributor of this type is described in published French patent application 2 625 815, covering an N×N optical distributor.

The s optical wavelength filters WF each have an input connected optically to an output of the optical distributor OD, an output connected optically to an output Oi of the switching network SSTSN and a control input connected to the output of a filter control circuit FCC, which circuit FCC has its input connected to the control bus CB over which it receives from the control processor unit CPU of the switching network commands for configuring the filters. The filters WF are transparent to the optical frequencies of the first set Fa1 of optical frequencies and each can be tuned to one of the f2 optical frequencies of the second set Fa2 of optical frequencies, which optical frequency then characterizes the destination consisting of the optical user, control or signalling receiver line URL, CRL or SRL connected to the filter output. The filters WF can be tuned to one or more optical frequencies from the third group Fa3 of optical frequencies.

In an alternative embodiment of the invention each of the filters WF is tuned so as:
- to be transparent for one or more sub-groups of optical frequencies of the groups Fa1 and Fa2 of optical frequencies, and possibly the group Fa3 of optical frequencies, each sub-group of optical frequencies comprising at least one optical frequency, and
- to block any optical frequency outside the tuned sub-groups.

In a further embodiment of the invention, the wavelength filters WF are identically transparent for the three groups Fa1, Fa2 and Fa3 of optical frequencies, their filter function being limited to blocking any optical frequency that is not in any of the three groups.

The set of optical wavelength filters WF constitutes a space-division distribution device routing to each of the receiver lines only the multiplexes which concern it. By limiting the spatial distribution of the multiplexes it protects the communication facility.

An embodiment of the various circuits is described hereinafter by way of example constituting the simplest form of the invention; the optical samples produced by the sources are modulated between two optical energy levels the lower of which enables operation of the circuits in FIG. 4C which identify the optical carrier frequency.

Figure 2A:
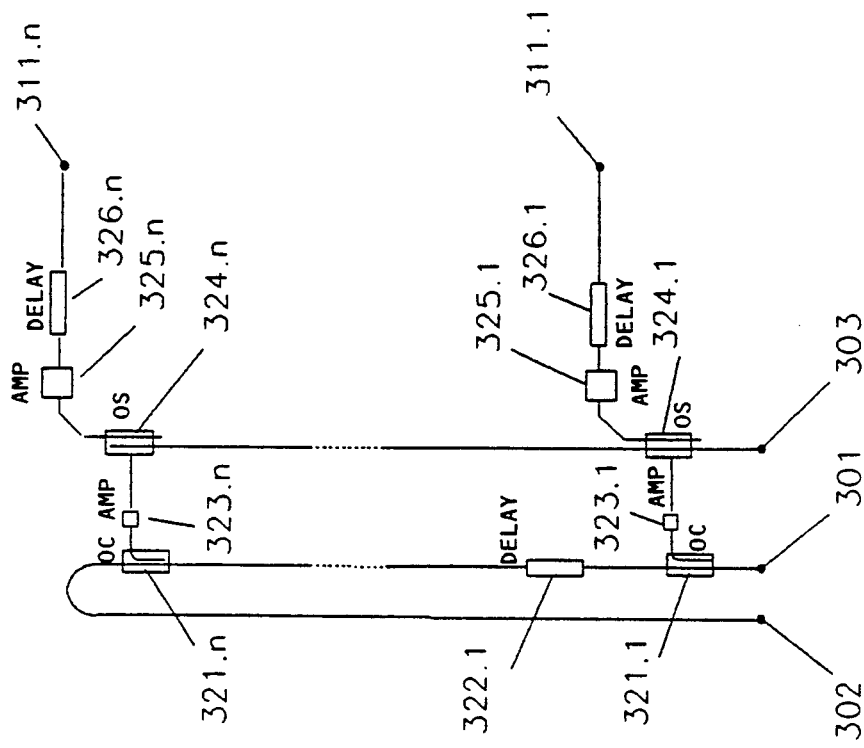

FIG. 2A is a schematic showing one embodiment of the input line scanner circuit LS from FIG. 1A, which comprises:
a first control device having its input 201 and its output 202 connected to the control circuit CC, and
an optical selector of which:
the inputs 210.1 through 210.n are each connected to one input I1 through In of the switching network SSTSN, the outputs 211.1 through 211.n are each connected to the input of a time-division switching unit TSU, and the output 203 is connected to the control circuit CC.

Said first control device is formed by a serial combination of n optical couplers 221.1 through 221.n each having an input and first and second outputs and n−1 identical optical delay lines 222.1 etc. each having an input and an output, the combination being such that the first output of each coupler except for the last is connected to the input of a delay line whose output is connected to the input of the next coupler, the input of the first coupler 221.1 and the first output of the last coupler 221.n being respectively connected to the input 201 and to the output 202 of said first control device, and the second output of each of the couplers 221.1 to 221.n is connected, possibly through an optical amplifier 223.1 etc., to a control input of the optical selector.

Said optical selector is formed by a set of n optical switches 224.1 through 224.n each having first and second inputs, an output and a control input, n optical couplers 226.1 through 226.n each having an input and first and second outputs, and n identical delay lines 227.1 through 227.n each having an input and an output. In this combination:

the optical switches 224.1 etc. are connected in series by connecting the output of one to the first input of the next, the output of the switch 224.1 being connected to the output 203 of the optical selector, the second input of each optical switch 224.1 etc. is connected to the second output of the same ranked coupler 226.1 etc., possibly through an optical amplifier 225.1 etc., the control inputs of the optical switches form the control inputs of the optical selector and each is connected to the second output of the same ranked optical coupler 221.1 etc. of said first control device, the input of each optical coupler 226.1 etc. is connected to the same ranked input of the n inputs 210.1 through 210.n of the line scanner, and the first output of each coupler 226.1 etc. is connected to the input of the delay line 227.1 etc. whose output is connected to the same ranked output 211.1 etc. of the line scanner.

Figure 2B:
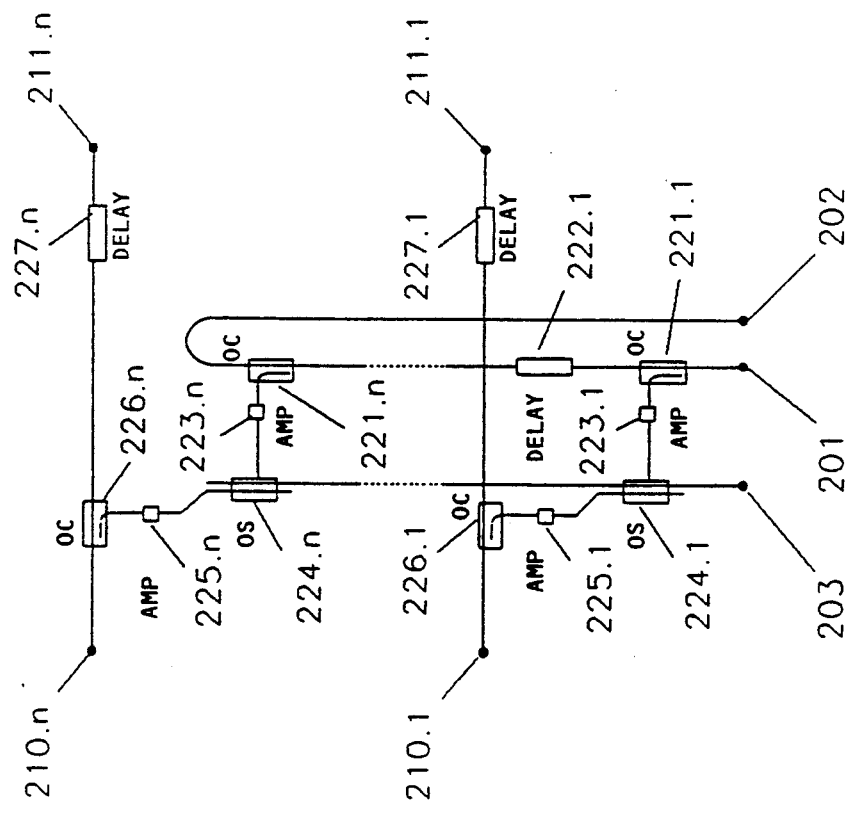

FIG. 2B is a schematic showing one embodiment of the command distributor CD which distributes commands to the time-division switching units TSU. Said command distributor CD comprises:

a second control device whose input 301 and output 302 are connected to the control circuit CC, and a distribution line whose input 303 is connected to the control circuit CC and whose outputs 311.1 through 311.n are each connected to the control input of one time-division switching unit TSU.

Said second control device comprises a set of n couplers 321.1 through 321.n with one input and two outputs and n−1 identical delay lines 322.1 etc., identical to the previously described first control device of the input line scanner LS.

Said distribution line comprises:

n optical switches 324.1 through 324.n each having one input, first and second outputs and a control input, n optical amplifiers 325.1 through 325.n with a characteristic showing hysteresis, that is different thresholds for high-low and low-high transitions, n delay lines 326.1 through 326.n each having a different length characterizing the rank of the delay line.

In said distribution line:

the n optical switches are connected in series by connecting the first output of one to the input of the next, the input of the switch 324.1 being connected to the input 303 of the distribution line, the second output of each of the n optical switches is connected by one of the n optical amplifiers to the input of one of the n delay lines, and the outputs of the n delay lines are each connected to one of the outputs 311.1 through 311.n of the distribution line; the control inputs of the optical switches 324.1 etc. are each connected to the second output of the same ranked coupler 321.1 etc. of said second control device, possibly through an amplifier 323.1 etc.

The optical amplifiers 325.1 etc. are opto-electronic amplifier devices operating in the same way as a monostable, for example.

FIGS. 3A and 3B each show one embodiment of the line scanner LS and the command distributor CD in which said first and second control devices shown in FIGS. 2A and 2B are combined in a single third control device.

In the first embodiment shown in FIG. 3A said third control device comprises the serial combination of n couplers 221.1 through 221.n and n couplers 321.1 through 321.n as already described and n first delay lines 231.1 through 231.n and n−1 second delay lines 331.1 etc., the general principle being as follows:

The first output of the coupler 221.i is connected to the input of the delay line 231.i whose output is connected to the input of the coupler 321.i whose first output is connected to the input of the delay line 331.i, the output of which is connected to the input of the coupler 221.i+1.

The input of the first coupler 221.1 and the first output of the last coupler 321.n are respectively connected to the input 201 and to the output 202 of said third control device.

The delay created by a pair of delay lines such as the lines 231.1 and 331.1 is equal to the delay created by the delay lines 222.1 or 322.1 of the FIG. 2A or 2B circuit.

If the FIG. 3A circuit is used in the preferred embodiment of the invention, the n−1 delay lines 331.1 etc. of said third control device would introduce no delay. In this application these n−1 delay lines are omitted and replaced by a direct connection from the first output of the coupler 321.i to the input of the coupler 221.i+1, the delay of the delay lines 231.1 etc. being then equal to the delay created by the delay line 222.1 or 322.1 of the FIG. 2A or 2B circuit. This embodiment of the line scanner LS and the command distributor CD is shown in FIG. 3B.

The other arrangements used in the circuit to implement the selector and the distribution line in FIGS. 3A and 3B are identical to those described with reference to FIGS. 2A and 2B.

Unless otherwise indicated, in the following description FIGS. 3A and 3B are collectively referred to as FIG. 3, as they represent the same functional entity.

Figure 4C:
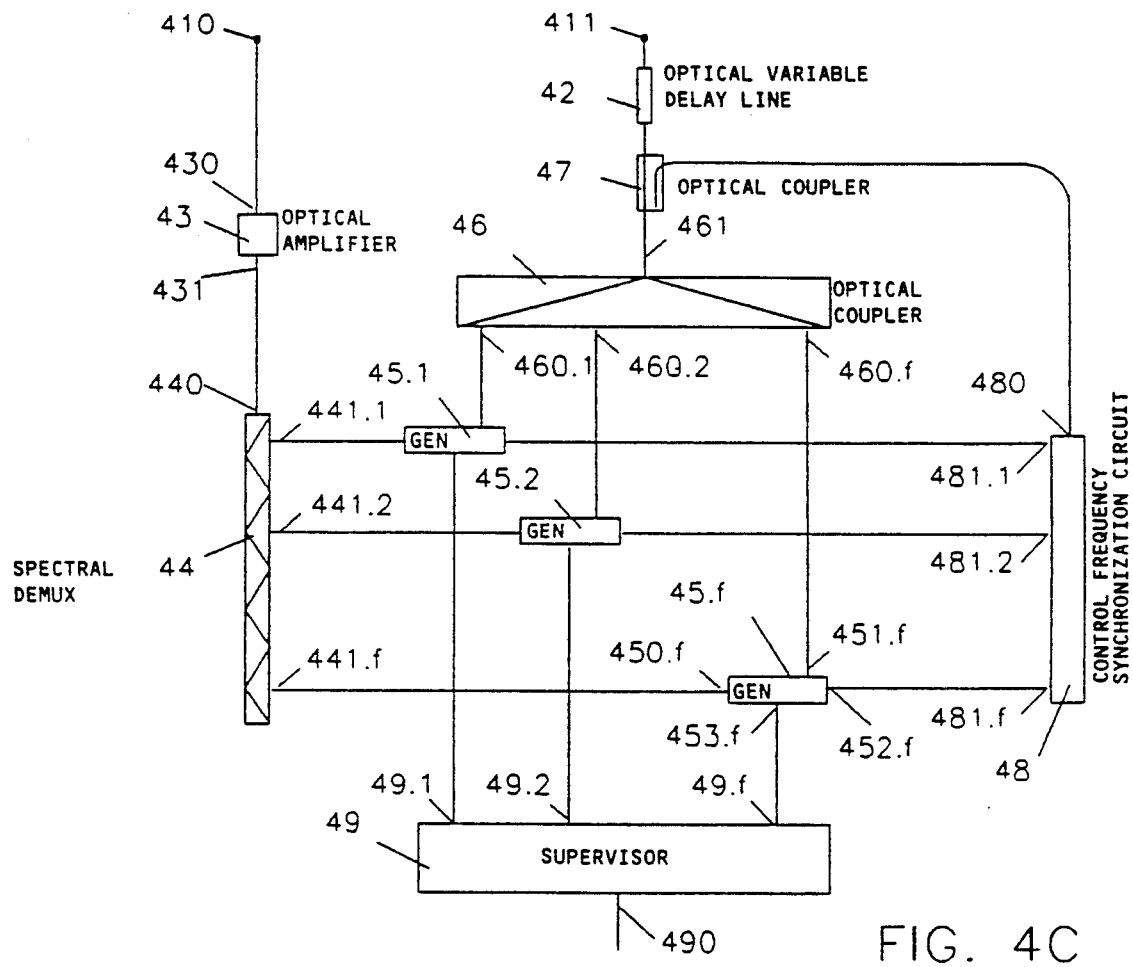

The combination of FIGS. 4A and 4C and the combination of FIGS. 4B and 4C respectively show the control circuit CC:

when the line scanner LS and the command distributor CD are as shown in FIGS. 2A and 2B, and when they are as shown in FIG. 3 (3A or 3B).

In both cases the control circuit CC comprises a command generator (FIG. 4A or 4B) and a control label multiplex generator (FIG. 4C).

FIGS. 4A and 4B show the circuit which generates the control circuit commands for the first and second cases as defined above, respectively. Said control circuit is connected to devices external to the circuit as follows:

The optical input 401 is connected optically to the synchronization line H1 of the switching network SSTSN which is optically connected to the clock unit CKU.

The electrical input 406 is connected to the command bus CB which is connected to the control processor unit CPU of the switching network.

The optical output 402 and the optical input 403 (FIG. 4A or 4B) are respectively connected to the optical input 201 and the optical output 202 of the control device (FIG. 2A or 3).

The optical output 404 and the optical input 405 (FIG. 4A) are optically connected to the input 301 and the output 302, respectively, of the control device (FIG. 2B).

In FIG. 4A, an optical pulse generator 421 produces an optical pulse of calibrated duration and has its input connected to the input 401 of the circuit and its output connected to the input of an optical coupler 422 dividing the optical energy equally between two outputs of which the first is connected direct to the first input of an optical switch 423.1 and the second is connected to the input of a delay line 424 whose output is connected to the first input of an optical switch 423.2, the switches 423.1 and 423.2 each having two inputs and two outputs and being controlled electrically via the control bus CB connected to the input 406.

The second output of the optical switch 423.1 is connected to the input of a delay line 425.1 whose output is connected to the output 402 of the circuit and the second input of the optical switch 423.1 is connected, if appropriate through an optical calibrator amplifier 427.1, to the output of the delay line 426.1 whose input is connected to the input 403 of the circuit.

Similarly, the second output of the optical switch 423.2 is connected to the input of a delay line 425.2 whose output is connected to the output 404 of the circuit and the second input of the optical switch 423.2 is connected, if appropriate through an optical calibrator amplifier 427.2, to the output of the delay line 426.2 whose input is connected to the input 405 of the circuit.

The delay lines 425.1, 425.2, 426.1 and 426.2 are optical variable delay lines and the optical calibrator amplifiers 427.1 and 427.2 are, for example, an opto-electronic device operating in the same way as a monostable with delayed triggering.

The circuit shown in FIG. 4B uses the same optical pulse generator 421 as above whose output is connected direct to the first input of an optical switch 423 which is controlled electrically via the line 406. The second output of the optical switch 423 is connected to the input of a dealy line 425 whose output is connected to the output 402 of the circuit and the second input of the optical switch 423 is connected, if appropriate through an optical calibrator amplifier 427, to the output of the delay line 426 whose input is connected to the input 403 of the circuit.

The delay lines 425 and 426 are optical variable delay lines and the optical calibrator amplifier 427 is, for example, an opto-electronic device operating in the same way as a monostable with delayed triggering.

FIG. 4C shows the control label multiplex generator which generates the control label multiplex CLM which carries the commands for the time-division switching units TSU. Said generator is connected to devices external to the circuit as follows:

The optical input 410 and the optical output 411 are respectively connected to the output 203 of the line scanner (FIG. 2A or 3) and to the input 303 of the command distributor (FIG. 2B or 3).

The electrical ports 490 are connected to the control bus CB connected to the control processor unit CPU of the switching networks.

The optical input 410, which receives the output label multiplex OLM, is connected, if appropriate through an optical amplifier 43, to the input 440 of a spectral demultiplexer 44 which has f outputs 441.1 through 441.f each connected optically to an individual time-division switching unit TSU optical command generator 45.f etc.

Each of the f generators 45.1 through 45.f is connected:

optically by its inputs 450.f etc. to one of the outputs 441.f etc. of the spectral demultiplexer 44 and by its outputs 451.f etc. to an input 460.f etc. of an optical coupler 46 which has f inputs 460.1 through 460.f and an output 461, electrically by a multiple port 453.f etc. to a port 49f etc. of a group of f ports 49.1 through 49.f of a supervisor 49, and electrically by a port 452.f etc. to one of the f outputs 481.f etc. of a control frequency synchronization circuit 48.

Said circuit 48 is itself connected optically by its optical input 480 to the second output of an optical coupler 47 having an input and two outputs, which coupler 47 is also connected optically by its input to the output 461 of the optical coupler 46 and by its first output to the input of an optical variable delay line 42 whose output is connected to the output 411 of the control label multiplex generator.

Said spectral demultiplexer 44 is of the type using an optical diffraction grating, familiar to those skilled in the art, or a type with tunable filters, one embodiment of which is described below.

Figure 4D:
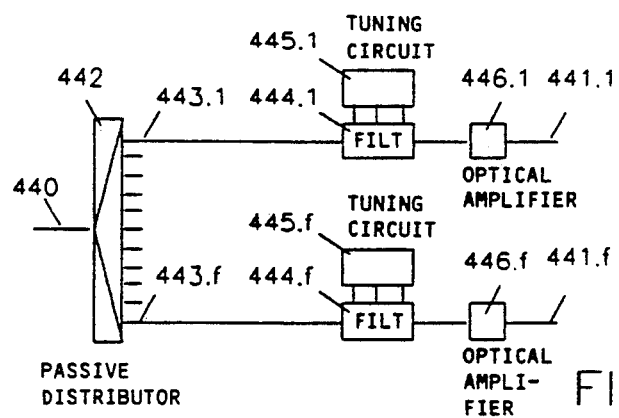

FIG. 4D shows one embodiment of a spectral demultiplexer 44 from FIG. 4C.

The optical input 440 of the demultiplexer is connected to a passive distributor 442 which produces from the optical wave reaching it f output channels 443.1 through 443.f each of which is optically connected to a tunable filter 444.1 etc. whose optical output is connected, if appropriate through an optical amplifier 446.1 etc., to the optical output 441.1 etc. of the demultiplexer corresponding to the channel.

The tunable filters 444.1 through 444.f each comprise a semiconductor optical amplifier device controlled electrically by the associated tuning circuit 445.1 etc. for the tunable filter 444.1 etc., so that the very narrow gain curve of the amplifier can be centered on the nominal optical filtering frequency.

By tuning each of the filters 444.1 through 444.f to one of the f optical frequencies of a group F of optical frequencies the combination of the passive distributor 442 and the tunable filters 444.1 through 444.f behaves like a spectral demultiplexer for any spectral or spectrotime-division multiplex using the f frequencies present at the input of the passive distributor 442.

In the circuit in accordance with the invention, the group F of filter tuning optical frequencies comprises at least the f2 frequencies of the previously defined group Fa2 of optical frequencies. The number f of outputs of the passive distributor 442 and the filters 444 from FIG. 4D and the generators 45.1 through 45.f from FIG. 4C is therefore at least equal to f2 and at most equal to $f_{max}$, the maximum number of optical frequencies that can be discriminated in an optical spectrum.

Figure 4E:
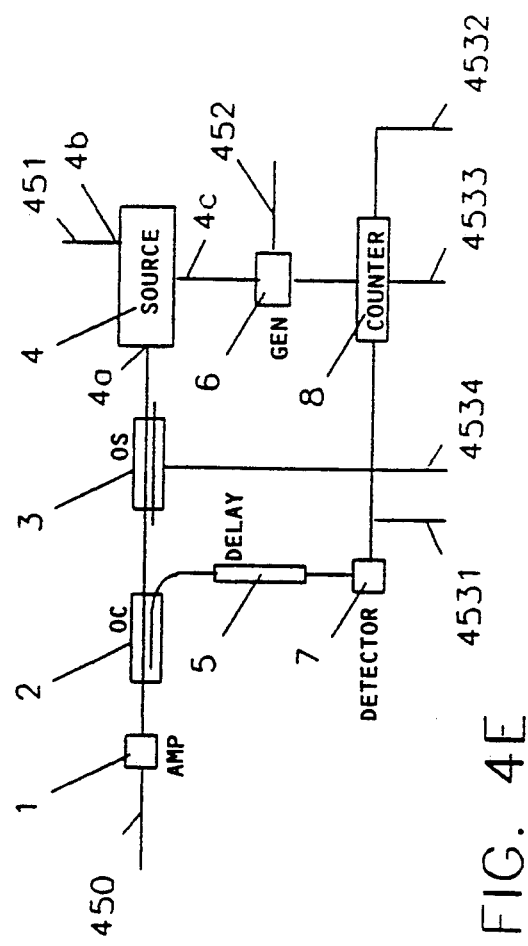

FIG. 4E shows in detail the circuit of a command generator 45.f from FIG. 4C. It generates time-division switching unit TSU commands. Its optical input 450 is connected, if appropriate through an optical amplifier 1, to the input of an optical coupler 2 with one input and two outputs. The coupler 2 is connected:

by its first output to the first input of an optical switch 3 which has two inputs and two electrically controllable outputs or which is in the form of an optically controllable optical crosspoint like that in FIG. 5B, whose control input is connected electrically to a port 4534, and by its second output to an optical delay line 5 whose output is connected to the optical input of a detector 7.

The output of the optical switch 3 is connected optically to the optical excitation input 4a of a tunable optical source 4 whose output 4b is connected optically to the output 451 of the generator and whose tuning control input 4c is connected electrically to the output of a circuit 6 for generating an electrical signal for tuning an optical source 4.

The circuit 6 is connected by a first control input to the output of a counter 8 and by a second control input to the input 452 of the generator. The counter 8 is connected electrically by a first input to the output of the detector 7, which is additionally connected to a port 4531, by a second input to a port 4532 and by a third input to a port 4533, said ports and the port 4534 connected to the control input of the switch 3 forming the multiple ports 453.f etc. of FIG. 4C connected to a supervisor 49.

The optical source 4 can be tuned to any optical frequency Fbj of the fb optical frequencies of a second set Fb of optical frequencies defined in the description of FIG. 1B, fb being at most equal to the maximum number $f_{max}$ of optical frequencies that can be discriminated in an optical spectrum, for example by the filter OF in FIG. 5B.

FIG. 5A shows one embodiment of a time-division switching unit TSU in which:

the input 501 and the control input 502 are respectively optically connected to one output of the line scanner LS and to the same ranked output of the command distributor CD as already described, and the k outputs 51.1 through 51.k are each connected optically to an input of the optical distributor OD which has (m+(n.k)) inputs and s outputs.

The time-division switching unit comprises:

a first optical delay line with multiple ports formed by the series combination of k−1 identical optical delay lines 54.1 through 54.(k−1) and k identical optical couplers 53.1 through 53.k each having an input and first and second outputs and routing to the second output a fraction of the optical energy arriving at the input and to the first output the remainder of this optical energy, the combination being such that:

the input 501 of the time-division switching unit is optically connected to the input of the coupler 53.1, and the first outputs of the couplers 53.1 through 53.(k−1) are each connected to the input of one of the delay lines 54.1 through 54.(k−1) whose output is connected to the input of the next ranked coupler 53.i, the output of the last delay line 54.(k−1) being connected to the input of the last coupler 53.k whose first output is not used in this circuit;

an all optical second delay line with multiple ports formed by the series combination of k identical optical couplers 56.1 through 56.k of identical design to the coupler 53.1 and k−1 identical delay lines 57.1 through 57(k−1) with the same specifications as the delay line 54.1, this combination being identical to that of the couplers and delay lines 53.i and 54.i described above, with the control input 502 connected optically to the input of the coupler 56.1;

k optically controlled optical crosspoints 55.1 through 55.k of a kind shown in FIG. 5B, these crosspoints being each tuned to one of the optical frequencies of said second set Fb of optical frequencies defined in the description relating to FIG. 4E, in the direction of increasing or decreasing optical frequencies; the input of each point is optically connected to the second output of the same ranked coupler of the first delay line with multiple ports; its output is connected to the same ranked output of the group of outputs 51.1 through 51.k; its control input is connected to the second output of the same ranked coupler of the second delay line with multiple ports.

FIG. 5B shows one embodiment of a crosspoint 55.1 etc. in the time-division switching unit TSU described above, comprising:

a semiconductor optical amplifier OA whose optical input and output are respectively connected optically to the optical input SI and the optical output SO of the crosspoint, an opto-electronic detector D whose output is connected electrically to the control input of the optical amplifier OA and whose optical input is connected to the optical output of an optical filter OF, and an optical filter OF which can be tuned to any optical frequency Fbj from the group Fb of optical frequencies and whose optical input is connected to the optical control input SC of the crosspoint.

Any optical signal at the frequency Fbj at the input SC of the crosspoint passes through the filter OF and excites the detector D which delivers at its output an electrical signal which excites the optical amplifier OA which produces at its output SO an amplified version of the optical signal present at its input SI for as long as the optical signal at the frequency Fbj is present.

FIGS. 5C and 5D each show one embodiment of a time-division switching unit TSU having a single output 51. In addition to the circuitry from FIG. 5A, the FIG. 5C circuit includes an optical coupler 58 which has k inputs each connected to the output of one of the k crosspoints 55.1 through 55.k and an output connected to the output 51 of the time-division switching unit TSU. The FIG. 5D circuit uses k optical couplers 58.1 through 58.k each having first and second inputs and an output. These couplers are combined in series by connecting the output of the rank i coupler to the first input of the rank i+1 coupler, the first input of the coupler 58.1 not being connected and the output of the coupler 58.k being connected to the output 51 of the time-division switching unit TSU. The second input of each coupler is connected to the output of the same ranked crosspoint 55.1 through 55.k.

If the switching network SSTSN uses time-division switching units TSU as shown in FIG. 5C or 5D, the optical distributor OD used in the switching network SSTSN has n+m inputs and s outputs.

Figure 6:
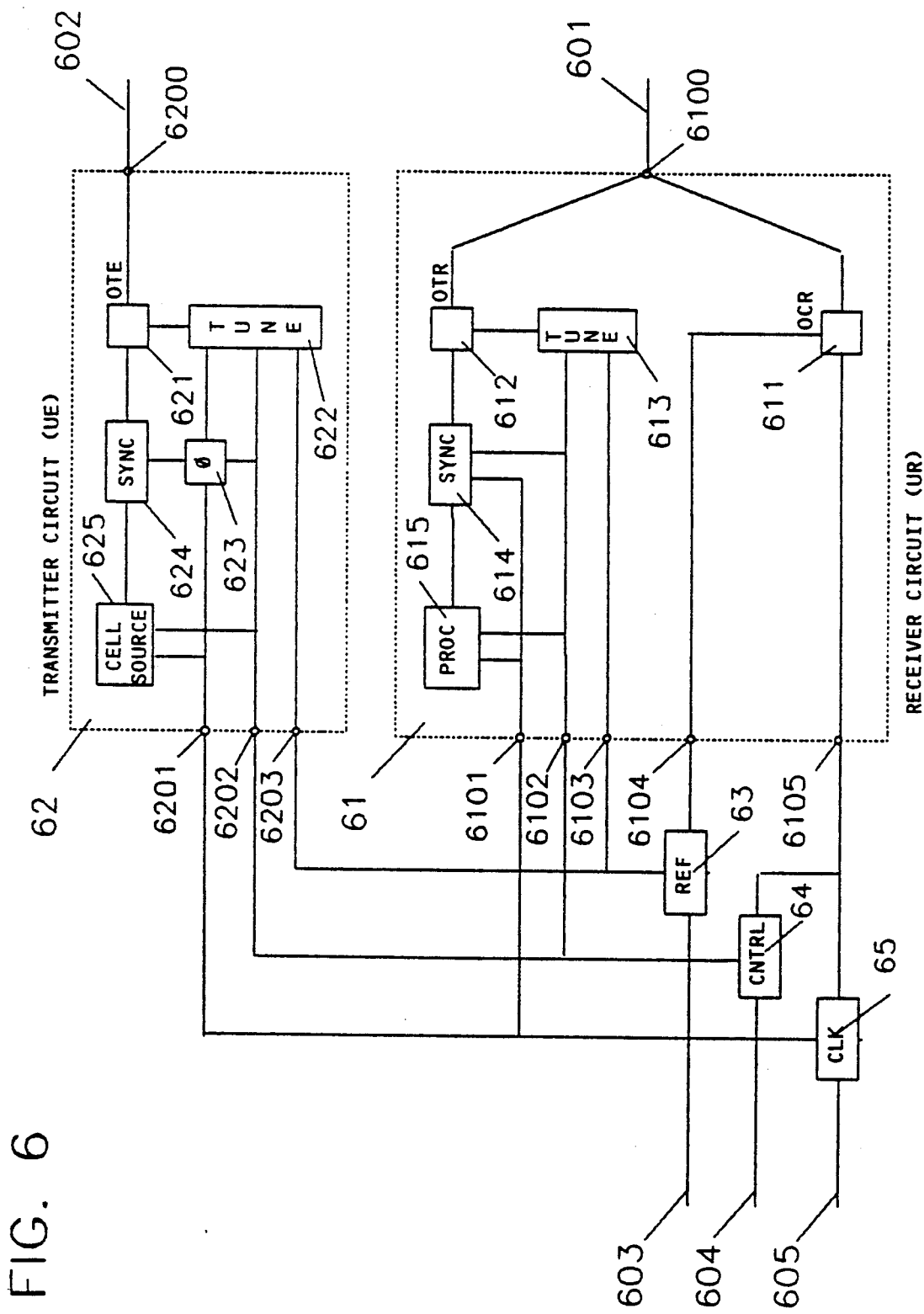
FIG. 6 is a schematic showing a communication terminal.

FIG. 6 is a schematic showing a communication terminal comprising:
a user receiver circuit 61 connected by its optical input 6100 to an optical fiber 601 connected to the switching network SN supporting the user receiver line URL on which are optically transmitted a control transmitter multiplex CEM and the user receiver multiplex URM,
a user transmitter circuit 62 connected by its optical output 6200 to an optical fiber 602 connected to the switching network supporting the user transmitter line UEL on which the user transmitter multiplex UEM is transmitted,
optical frequency reference means 63 having an input connected to an output 6104 of the user receiver circuit 61, a first output connected to an input 6103 of the user receiver circuit 61 and to an input 6203 of the user transmitter circuit 62, and a second output,
control means 64 having an input connected to an output 6105 of the user receiver circuit 61, a first output connected to an input 6102 of the user receiver circuit 61 and to an input 6202 of the user transmitter circuit 62, and a second output,
a synchronizable clock signal generator 65 having an input connected to the output 6105 of the user receiver circuit 61, a first output connected to an input 6101 of the user receiver circuit 61 and to an input 6201 of the user transmitter circuit 62, and a second output.

Said second outputs of said frequency reference means 63, control means 64 and synchronizable clock signal generator 65 are if appropriate connected to respective inputs 6103, 6102, 6101 of other user receiver circuits identical to the circuit 61 and constituting receive terminals and/or to other inputs 6203, 6202, 6201 of other user transmitter circuits identical to the circuit 61 and constituting transmit terminals.

The user receiver circuit 61 comprises:
an optical control receiver 611 tuned to one optical frequency from the first group Fa1 of optical frequencies and receiving said control transmitter multiplex CEM,
an optical transmission receiver 612 which can be tuned to any optical frequency of the second group Fa2 of optical frequencies and receiving said user receiver multiplex URM,
means 613 for tuning the frequency of the optical transmission receiver 612,
time synchronization means 614 for the receive information cells, and
means 615 for processing the received information.

The optical control receiver 611 is connected by its optical input to the optical input 6100 of the user receiver circuit, by a first output delivering an optical frequency reference signal to the output 6104 and by a second output delivering the information received from the control transmitter multiplex CEM to the output 6105 of the user receiver circuit.

The optical transmission receiver 612 is connected by an optical input to the optical input 6100 of the user receiver circuit, by a control input to an output of the frequency tuning means 613 and by an output delivering the information received from the user receiver multiplex URM to an input of the time synchronization means 614. The time synchronization means 614 is connected by an output to an input of the processing means 615.

The frequency tuning means 613, time synchronization means 614 and processing means 615 are each connected by a control input to the input 6102 of the user receiver circuit 61, the time synchronization means 614 and processing means 615 being each further connected by a synchronization input to the input 6101 of the user receiver circuit, the frequency tuning means 613 being connected by a frequency reference input to the input 6103 of the user receiver circuit.

The user transmitter circuit 62 comprises:
an optical transmission transmitter 621 which can be tuned to any optical frequency of the second group Fa2 of optical frequencies,
means 622 for tuning the frequency of the optical transmission transmitter 621,
time synchronization means 624 for the information cells to be transmitted,
information cells to be transmitted source means 625, and
phase alignment means 623.

The optical transmission transmitter 621 is connected by an optical output to the optical output 6200 of the user transmitter circuit, by a control input to an output of the frequency tuning means 622 and by a signal input to an output of the time synchronization means 624 transmitting the cells of information to be transmitted optically in the user transmitter multiplex UEM.

The time synchronization means 624 is connected by an input to an output of the source means 625 and by a synchronization input to a first output of the phase alignment means 623 whose second output is connected to a synchronization input of the frequency tuning means 622.

The frequency tuning means 622, the phase alignment means 623 and the source means 625 are each connected by a control input to the input 6202 of the user transmitter circuit 62, the phase alignment means 623 and the source means 625 being also each connected by a synchronization input to the input 6201 of the user transmitter circuit and the frequency tuning means 622 being connected by a frequency reference input to the input 6203 of the user transmitter circuit.

The invention will be better understood from the following description:
of the general operation of the communication system in accordance with the invention in ATM mode, which is the preferred operating mode of the invention, and
the general operation of the switching network SSTSN in accordance with the invention.

To simplify the description of the general operation of the system arrangements and procedures routinely used in communication systems and therefore well known in themselves employed in the general context of the invention will not be described in detail. Also, it is assumed that the communication system in accordance with the invention is configured as follows:
the control processor unit CPU (FIG. 1) is connected to the switching network SSTSN by a single line of each type CEL, SEL, CRL, SRL each carrying a multiplex CEM or SEM or CRM or SRM, and the terminals connected to the switching network SN are communication terminals each comprising:
- a user transmitter circuit UE transmitting on the user transmitter line UEL a user transmitter spectrotime-division multiplex UEM using a tunable optical transmission transmitter,
- a user receiver circuit UR receiving on the user receiver line URL the control transmitter multiplex CEM and a user receiver multiplex URM, the receive circuit UR including an optical control receiver and an optical transmission receiver, and
- various other functional units including the optical frequency tuning units of said optical transmitters and receivers, a synchronizable clock signal generator, a time synchronization unit and a phase alignment unit for the user transmitter circuit, a time synchronization unit for the user receiver circuit and control processor unit supervising the various other functional units.

With reference to the preceding description, it will be remembered that:

the control transmitter multiplex CEM has a frame structure:
- each time slot has a duration T,
- the frame comprises c time slots,
- the frame period is c.T,
- the first time slot of each frame carries a code identifying the frame start, as is well known in the time-division switching art,
- the other time slots are identical and are used by the control processor unit CPU to transmit control messages to the terminals;

the multiplexes CRM, SEM, SRM, UEM and URM are organised into a sequence of identical time slots with duration T;
- the identical time slots convey information to be transmitted in the form of optical samples of duration T comprising three parts of which only the second part carries the transmitted information, the first and third parts constituting switching windows avoiding the need for perfect phase alignment of the sample to be switched in the local timing system of the switching network SSTSN;
- the information to be transmitted, if digital in nature, is formatted in cells each of which is carried by one optical sample;
- the optical samples are encoded for transmission at an optical frequency which characterizes their destination, except for samples of broadcast multiplexes like the control transmitter multiplex CEM which are all encoded optically at the frequency characterizing the control function;

the switching network SSTSN:
- broadcasts the control transmitter multiplex CEM on each of the control, signalling and user receiver lines CRL, SRL and URL,
- switches the optical samples of the signalling and user transmitter spectro-time-division multiplexes SEM and UEM according to their optical carrier frequency, which characterizes their destination, initially by time-division switching according to the availability of time slots of the output label multiplexes, then by space-division switching by spectral multiplexing, broadcasting and selection by spectral filtering of samples which have the same carrier frequency,
- transmits switched samples on the control, signalling or user receiver lines CRL, SRL or URL in the time slots of the control, signalling or user receiver time-division multiplexes CRM or SRM or URM;

the control transmitter multiplex CEM is broadcast on each receiver line and received by the optical control receiver of the control, signalling or user receiver circuits CR, SR, UR and the control, signalling or user multiplexes CRM, SRM or URM transmitted on the control, signalling or user lines CRL or SRL or URL are respectively received optically by the optical transmission receiver of the control, signalling or user receiver circuits CR or SR or UR.

When the system is started up:
- the optical transmitter of the user transmitter circuit CE and the optical control receiver of the control, signalling and user receiver circuits CR, SR and UR are tuned to the optical frequency Fa1.1 and all the filters WF are set to be transparent at this optical frequency, and
- the optical transmission receiver of the control and signalling receiver circuits CR and SR and the filters WF connected to the control and signalling receiver lines CRL and SRL are respectively tuned to the frequencies Fa2.1 and Fa2.2.

When this situation is established, by means of arrangements to be described later:
- the terminal clock signal generators are synchronized to the clock unit CKU of the switching network, and
- the terminals have a frequency reference enabling operation of the optical frequency tuning means of their optical transmission transmitters and receivers; the terminals can then be initialized by the control processor unit CPU of the switching network.

The time synchronization, frequency tuning and terminal initialization arrangements of the system in accordance with the invention will now be described. In the switching network SN the clock unit CKU sends permanently on the line H2 a clock signal with period T delimiting the time slots and a clock signal with period c.T delimiting the frames. These signals are used by the control processor unit CPU to format the control transmitter multiplex CEM which is transmitted by the optical transmitter of the user transmitter circuit CE at the optical frequency Fa1.1 on the control transmitter line CEL and broadcast by the optical distributor OD of the switching network SSTSN, the filters WF being transparent at the frequency Fa1.1, on all receiver lines, in particular the user receiver lines URL connected to the switching network SSTSN.

The control receiver of each receiver circuit tuned to the optical frequency Fa1.1 receives continuously the control transmitter multiplex CEM. The frame start identification code carried by the first time slot of the control transmitter multiplex CEM is processed by clock signal generators in the terminals in order to synchronize on the master clock of the clock unit CKU of the switching network SN using methods well known in the time-division switching system art.

Each local clock signal generator transmits to the synchronization means of the transmitter and receiver circuits of the terminal a time slot synchronization signal. The optical frequency Fa1.1 of the control transmitter multiplex CEM is used by the frequency tuning means of the terminals as a reference frequency for tuning the optical transmission transmitters and receivers of the transmitter and receiver circuits to the optical frequencies of the group Fa2 of optical frequencies.

When the system is started up and each time a terminal is started up a procedure for initializing each terminal to be started up is run by the control processor unit CPU which:

allocates a frequency Fa2.i to the user receiver circuit UR of the terminal to be initialized, uses the filter control circuit FCC to set the filter WF in the switching network SSTSN connected to the user receiver line URL of the terminal to be initialized to said frequency Fa2.i, and transmits to the terminal being initialized over the control transmitter multiplex CEM an initialization message including:
the terminal identifier,
a code designating the initialization function,
the references Fa2.1 and Fa2.2 of the optical carrier frequencies of the control and signalling receiver multiplexes CRM and SRM, and
the reference of the optical frequency Fa2.i temporarily allocated to the user receiver circuit UR of the terminal.

When it receives the initialization message the control processor unit of the terminal being initialized tunes the optical transmission receiver of the receiver circuit to the optical frequency Fa2.i and adjusts the phase alignment means of the transmitter circuit synchronization circuit. The phase alignment means shifts the phase of the time slot clock received from the local clock signal generators so that the time slots of the user transmitter multiplex UEM, which are timed by the phase-shifted time slot clock, reach the input of the switching network SSTSN of the switching network in phase with the time slot clock of said switching network SSTSN. The phase alignment of the time slots need not be perfect because of the previously explained organization of the optical samples. Before correction, the phase-shift of the time slots at the input of the switching network SSTSN is at least equal to the sum of the propagation times of the optical samples of the control transmitter multiplex CEM on the user receiver line URL and of the user transmitter multiplex UEM on the user transmitter line UEL.

The phase alignment means is adjusted using the following sequence of operations:

a phase-shift value is written into the phase alignment means of the transmitter circuit synchronization circuit, a phase alignment code is transmitted in the form of an optical sample encoded by the optical transmitter at the optical frequency Fa2.i in a time slot of the user transmitter multiplex UEM synchronized to the phase-shifted clock from the phase alignment means, the sample is switched by the switching network SSTSN and transmitted in the first available time slot of the user receiver multiplex URM at the frequency Fa2.i, and the switched code is received by the user receiver circuit and the received code is checked.

This sequence is repeated with the phase-shift value increased each time until the received code, which is degraded by the switching process if the phase of the sample is incorrect at the input of the switching network SSTSN, is correct. The value of the phase-shift producing the first correct transmission is stored by the terminal control processor unit and the process is continued by increasing the phase-shift value until incorrect transmission results. This new phase-shift value is stored and the phase alignment means is then set by the terminal control processor unit to the average of the two stored phase-shift values. The terminal is then operational.

When the adjustment has been completed the terminal sends in its user transmitter multiplex UEM a message indicating that phase alignment has been done and carried by optical samples encoded at the frequency Fa2.1 which is that of the control receiver multiplex CRM. After switching in the switching network SSTSN, these samples are transmitted on the control receiver multiplex CRM and received by the control processor unit CPU.

On receiving the "phase alignment done" code, the control processor unit CPU sends to the terminal a control message encoded at the frequency Fa2.i. This message is transmitted in the signalling transmitter multiplex SEM on the signalling transmitter line SEL and then switched by the switching network SSTSN into the user receiver multiplex URM of the terminal. The terminal responds to the control processor unit CPU by sending in its user transmitter multiplex UEM a message containing the received control code encoded optically at the frequency Fa2.2, which is the frequency of the signalling receiver multiplex SRM. This message is switched by the switching network SSTSN into the signalling receiver multiplex SRM on the signalling receiver line SRL and received by the control processor unit CPU.

On receiving this message, and after checking the returned received code, the control processor unit CPU:

uses the filter control circuit FCC to deactivate the filter WF connected to the user receiver line URL serving the terminal, which was previously tuned to the frequency Fa2.i, sends a message encoded at the frequency Fa1.1 in the control transmitter multiplex CEM to put the terminal on standby (on receiving this command the terminal deactivates the optical transmission receiver of its receiver circuit, acknowledges reception by sending the control processor unit CPU a message in the user transmitter multiplex UEM at the frequency Fa2.1 which is the frequency of the control receiver multiplex CRM and goes to the standby mode in which it monitors the control transmitter multiplex CEM continuously using the optical control receiver of its receiver circuit which is tuned to the frequency Fa1.1), and on receiving the message from the terminal, releases the optical frequency Fa2.i.

A terminal on standby needing to set up a call to another terminal sends in its user transmitter multiplex UEM at the frequency Fa2.1 designated as the control receiver multiplex CRM access frequency a message for the control processor unit CPU containing its identity and a receive frequency allocation request. On receiving this message the control processor unit CPU allocates a frequency Fa2.j to the terminal, tunes to this frequency the filter WF providing access to the user receiver line URL of the terminal and sends to the terminal by means of a message in the control transmitter multiplex CEM the reference of the allocated frequency Fa2.j. This frequency Fa2.j is retained by the terminal throughout its period of activity.

At the end of the period of activity the terminal sends to the control processor unit CPU in its user transmitter multiplex UEM at the frequency Fa2.1 designated as the control receiver multiplex CRM access frequency and end of activity message containing its designation and the reference Fa2.j of the frequency to be released, and goes to the standby state. On receiving the message the control processor unit CPU de-activates the filter WF connected to the user receiver line URL of the terminal and releases the frequency Fa2.j.

Any active terminal wishing to set up a call sends to the control processor unit CPU in the signalling receiver multiplex SRM a call request message including its identity and that of the called terminal. If the called terminal is not active the control processor unit CPU assigns to it a free receive frequency Fa2.k, tunes to this frequency the filter WF connected to the user receiver line URL of this terminal and sends to the called terminal in the control transmitter multiplex CEM an activating message containing the identity of the called terminal, the activating command and the reference of the allocated frequency Fa2.k. Having detected the message and set itself to the appropriate mode, the called terminal sends to the control processor unit CPU an acknowledgement message encoded optically at the frequency Fa2.1 which is switched by the switching network SSTSN onto the control receiver multiplex CRM on the control receiver line CRL on which it is received by the control processor unit CPU.

The control processor unit CPU then sends to the calling terminal the reference of the frequency Fa2.k allocated to the called terminal by means of a message encoded at the caller's frequency Fa2.j in the signalling transmitter multiplex SEM on the signalling transmitter line SEL and switched by the switching network SSTSN onto the user receiver multiplex URM on the user receiver line URL of the called terminal at the frequency Fa2.j.

If the called terminal is active at the time of the call request the control processor unit CPU responds to receiving the request by sending in the signalling transmitter multiplex SEM the reference of the frequency Fa2.k already allocated to the called terminal. On receiving the frequency reference Fa2.k of the called terminal, the calling terminal can send the latter a call request message encoded at the frequency Fa2.k containing the designation of its own receive frequency Fa2.j. If the called terminal does not respond, the calling terminal repeats this procedure.

A terminal can communicate with a multiplicity of different terminals at the same time. Consider, by way of example, a terminal j allocated the frequency Fa2.j communicating with a terminal b allocated the frequency Fa2.b and another terminal w allocated the frequency Fa2.w. The information cells relating to the (j/v) and (j/w) calls are multiplexed statistically at the input of the transmit circuit of the terminal j and transmitted in the user transmitter multiplex UEM.j on the user transmitter line UEL.j by the optical transmitter of the transmitter circuit in the form of optical samples respectively encoded at the frequency Fa2.v or Fa2.w characterizing their destination.

In the switching network SSTSN the optical samples encoded at the frequency Fa2.v and the optical samples encoded at the frequency Fa2.w from the user transmitter multiplex UEM.j are first rearranged in time by the same time-division switching unit TSU.j so that each is in the first free time slot of the output label multiplex, which is the user receiver multiplex URM.v for the former and the user receiver multiplex URM.w for the latter; the former are rearranged in time under the control of the command generator 45.v and the latter under the control of the command generator 45.w of the group of command generators 45.1 through 45.f from FIG. 4C.

From the output of the time-division switching unit TSU.j, and following distribution by the optical distributor OD, these samples are selected spectrally by the filters WF.v and WF.w and respectively transmitted in the user receiver multiplex URM.v on the user receiver line URL.v which transmits them to the terminal v and in the user receiver multiplex URM.w on the user receiver line URL.w which transmits them to the terminal w. In these terminals the samples are received by the optical transmission receiver of the receiver circuit of the terminal tuned to their optical carrier frequency.

The information cells relating to the (v/j) call, multiplexed statistically with other cells with different destinations, are transmitted by the transmit circuit of the terminal v in its user transmitter multiplex UEM.v on its user transmitter line UEL.v in the form of optical samples encoded at the frequency Fa2.j of the terminal j.

Similarly, and simultaneously, the information cells relating to the (w/j) call, multiplexed statistically with other cells with different destinations, are transmitted by the transmitter circuit of the terminal w in its user transmitter multiplex UEM.w on its user transmitter line UEL.w in the form of optical samples encoded at the frequency Fa2.j of the terminal j.

In the switching network SSTSN the optical samples encoded at the frequency Fa2.j from the user transmitter multiplexes UEM.v and UEM.w are successively rearranged in time by the time-division switching units TSU.v and TSU.w under the control of the same command generator 45.j of the group of command generators 45.1 through 45.f from FIG. 4C. Each is placed in the destination user receiver multiplex URM.j in the first time slot which is free when their time switching command is generated. From the output of the time-division switching units TSU, and after distribution by the optical distributor OD, they are selected spectrally by the filter WF.j and transmitted in the user receiver multiplex URM.j on the user receiver line URL.j which transmits them to the terminal j. In this terminal they are successively received by the optical transmission receiver of the receiver circuit tuned to the frequency Fa2.j.

Obviously the cells transmitted by the different terminals each include a code identifying the call concerned to enable them to be processed at the output of the receiver circuit, as is well known in the asynchronous communications art.

Calls are charged by the control processor unit CPU. To implement this function the control processor unit CPU has the references of the communicating terminals, obtained when calls are set up, and data obtained by measuring the throughput of optical samples. This measuring is done by the circuit 49 from FIG. 4C, using throughput counters activated by a count signal which is defined in the description given later of the detailed operation of the switching network SSTSN. This data comprises:

the reference of the source and the reference of the destination, which are respectively deduced by the circuit 49 from the time reference of the count signal from the output label multiplex OLM and the reference of the generator 45.i which supplied the count signal, and the output state of a throughput counter assigned to monitoring the call defined by these two references.

The operation of the switching network SSTSN will now be described in detail.

The time slots are phase aligned at the transmitting end by the phase alignment means, the setting up of which has already been described. The contemporaneous time slots of the various transmitter spectro-time-division multiplexes (UEM, SEM) arrive at the inputs I1 through In of the switching network SSTSN in phase with each other and with a local clock of the clock unit CKU of the switching network SN (FIG. 1A).

Each carries an optical sample with an optical carrier frequency Fa2.i characterizing its destination. They are therefore in phase at the inputs 210.1 through 210.n of the input line scanner (FIG. 3) directly connected to the inputs In etc.

Ti and T are respectively the time reference and the duration of a time slot of the transmitter multiplexes and n is the number of inputs of the line scanner. At the start of each time slot interval Ti the calibrated optical pulse generator 421 of the control circuit from FIG. 4B, excited by an optical clock pulse received from the clock unit CKU over the line H1 at the input 401, formats an optical scanning pulse of duration $t = T/(n+2)$. This pulse is transmitted to the output 402 delayed by an amount t by the delay line 425. The scanning pulse, received at the input 201 of the circuit from FIG. 3B, propagates through said third control device, is delayed by an amount t by each of the delay lines 231.1 through 231.n and successively actuates the optical switches 224.1 through 224.n of said optical selector. These switches transmit an optical "address signal" to the output 203, in succession, formatting it to the duration t. This address signal is sampled by each switch 224.1 etc. in the signal present at its input, which signal is in the form of the energy part sampled by the associated coupler 226.1 etc. from the optical sample of the transmitter multiplex at the inputs 210.1 etc. of the optical selector during the time period Ti, which energy part is if appropriate amplified and calibrated in level by the amplifiers 225.1 etc.

The n successive address signals transmitted to the output 203 during the time period Ti form the usable part of a frame of the output label multiplex OLM described with reference to FIG. 1B, which frame comprises (n+2) time slots of which the first and the last are used for phase alignment of the multiplex.

The rank r of an address signal in the n address signals of the same frame characterizes the source of the optical sample of the transmitter multiplex from which the address signal originates.

The optical carrier frequency Fa2i of each of these n address signals characterizes the destination of the optical signal of the transmitter multiplex from which the address signal originates.

The n address signals of each frame of the output label multiplex OLM, passing through the input 410 and the amplifier 43 of the circuit from FIG. 4C, are successively analyzed by the spectral demultiplexer 44 which routes them according to their optical carrier frequency Fa2i to one of the command generators 45.f etc., each of which is responsible for managing the time slots of one of the control, signalling and user receiver multiplexes CRM, SRM and URM and for producing commands for the time-division switching units TSU for all the optical samples to be routed onto these multiplexes irrespective of their source.

In the command generators 45.f etc., the construction of which is shown in FIG. 4E, the optical address signal from the spectral demultiplexer is:

applied to the input 450, amplified by the optical amplifier 1, calibrated in time by the optical switch 3 excited by a clock signal with period t delivered by the supervisor 49 from FIG. 4C on the line 4534. This clock signal enables transient states between the successive optical address signals to be inhibited. Some of its energy having been sampled by the coupler 2 and sent in the delay line 5, this clock signal arrives at the input 4a of the optical source 4.

The optical source 4 can be tuned to any of the fb optical frequencies of the second set Fb of optical frequencies. It is set by the tuning signal generator 6 to transmit at the frequency Fbj designated by the information at the output of the counter 8.

The designated frequency Fbj characterizes the actual time-delay to be introduced into the propagation of the optical sample to be switched from which the optical address signal at the input 4a is obtained, to enable its insertion into the first free time slot of the destination receiver multiplex, and to enable the crosspoint to be excited in the time-division switching unit TSU (FIG. 5A, 5B or 5C) which processes the optical sample.

Receiving the optical address signal at its input 4a, the optical source 4 from FIG. 4E transmits to its output 4b throughout the duration of this address signal, in other words for a time period at most equal to t, an optical signal controlling the time-division switching unit TSU concerned at the optical frequency Fbj.

At the end of this transmission the detector 7, excited by the energy part which has passed through the delay line 5, transmits an optical pulse which increases by unity the value of the information at the output of the counter 8. By means of the timing generator 6, the new information at the output of the counter 8 sets the source 4 to the new frequency Fbj+1 to transmit so that the next optical sample to be switched can be time-delayed so that it is carried by the new first free time slot of the output label multiplex.

The output pulse from the detector 7 is transmitted by the line 4531 to the circuit 49 from FIG. 4C which uses it in the context of a continuous policing process of monitoring the throughputs of the different terminals, and as a count signal for incrementing throughput counters whose states are periodically transmitted to the control processor unit CPU which uses them to charge calls.

If the destination lines are saturated or if the switching capabilities of the time-division switching units TSU are exceeded, characterized by the counter 8 overflowing, a signal is sent on the line 4533 to the circuit 49 which temporarily disables:

the generator by setting the optical switch 3 via the line 4534 to the off condition, in order to prevent overwriting optical samples already being switched in the time-division switching units TSU, and any incrementing by unity of the value of the counter 8 by a disabling command transmitted on the line 4533.

At the start of the time period Ti+1 corresponding to a new frame of the output label multiplex OLM, a pulse transmitted by the FIG. 4C circuit 49 to the input 4532 of the counter 8 of each of the command generators 45.f etc. decrements the value of the counters 8 by unity in order to reset them to the actual time-delay value for the next connections commanded in the time-division switching units TSU, unless the counter is at its minimum value, in which case its value is not changed.

If at the end of a time interval Ti a counter 8 has a value Fbj+1 different than the minimum value Fb0, at the start of the time interval Ti+1 the counter is set to the value Fbj; if it has the minimum value Fb0, it remains at this value Fb0.

When the switching network SSTSN is initialized, the circuit 49 sets the counters 8 to the initial state (Fb0) using the line 4533, the other functions of which are described above.

Via the tuning generator 6, the new information at the output of the counter 8 sets the source 4 to the new frequency Fbj+1 to be transmitted so that the next optical sample to be switched is time-delayed in order to be carried by the new first available time slot of the output label multiplex.

At each time interval Ti the successive commands transmitted by the various generators 45.f etc. from FIG. 4C are switched by the coupler 46 and the variable delay line 42 to the output 411 at which they appear in succession and constitute the active part of a frame of the control label multiplex CLM which comprises, like that of the output label multiplex OLM from which it originates, n+2 channels of which the first and the last are used for phase alignment of the multiplex and the n others carry any commands.

The variable delay line 42 is adjusted so that the channels of the control label multiplex CLM are offset relative to the same ranked channels of the output label multiplex OLM by an amount $t = T/(n+2)$.

If d is the duration of the operations previously described which generate a command, between the occurrence of the scanning pulse at the second output of the coupler 221.1 of said third control device from FIG. 3B and the occurrence at the input of the delay line 42 of the command obtained from the address signal created by the switch 224.1 controlled by the output of the coupler 221.1, the delay line is adjusted to the delay value $t-d$.

If the FIG. 3A circuit is used instead of the FIG. 3B circuit, the delay line 42 is set to introduce no delay and the delay lines 231.1 and 331.1 etc. from FIG. 3A respectively apply a delay of d and $t-d$.

If the duration d defined above is greater than the duration t, the circuit shown in FIG. 3A or FIG. 3B is not used. It is replaced by a circuit combining the circuits shown in FIGS. 2A and 2B, which are controlled by the control circuit shown in FIG. 4A, rather than the circuit from FIG. 4B mentioned above. In this case, the delay line 424 from FIG. 4A has a delay value equal to d and the delay line 42 from FIG. 4C introduces no delay.

The control label multiplex CLM is sent from the output 411 of the control label multiplex generator from FIG. 4C to the input 303 of the distribution line from FIG. 3B, along which it is propagated.

Successively activated by the signal appearing at the output of the couplers 321.1 through 321.n as the scanning pulse propagates in said third control device as already described above, the switches 324.1 through 324.n switch to the hysteresis-characteristic amplifiers 325.1 etc. connected to their second output the command carried by the time slot of the control label multiplex CLM contemporaneous with their control pulse.

These amplifiers 325.1 etc., receiving a command of approximate duration t at the optical carrier frequency Fbj, produce at their output an optical signal at the same frequency Fbj and with a duration equal to T, which signal is then delayed by the delay lines 326.1 etc. by an amount equal to $(n+1-r).t$, where r is the rank of the delay line concerned in the group of n delay lines 326.1 through 326.n.

By virtue of this procedure the commands generated during the time slot period Ti of the transmitter multiplexes are output in phase at time Ti+1, each at one of the outputs 311.1 through 311.n of the distribution line.

The optical samples from the various transmitter spectro-time-division multiplexes (UEM, SEM) arrive in phase at time Ti at the inputs 210.1 through 210.n of the input line scanner and are delayed by a time T in the delay lines 227.1 etc. They therefore exit in phase at time Ti+1, each at one of the outputs 211.1 through 211.n of the input line scanner, and therefore simultaneously with the commands which switch them in the time-division switching units TSU.

Each optical sample and the associated commands are therefore presented in phase, respectively to the input 501 and to the control input 502 of the time-division switching unit TSUr connected to the output 211.r of the line scanner LS and the output 311.r of the command distributor CD.

In this time-division switching unit TSUr, which is a time-division switching unit TSU as shown in FIG. 5, they propagate in phase, respectively in the first and second multiple port delay lines of the time-division switching unit TSU, delayed by a time T by each of the delay lines 54.1 and 57.1 etc. they pass through.

In the first delay line each coupler 53.1 etc. samples some of the energy of the optical sample which passes through it and therefore presents to the input of the crosspoints 55.1 etc. connected to it a signal which is similar, apart from its energy levels, to the incident optical samples and in particular is at the same optical frequency Fa2i.

In the second delay line each coupler 56.1 etc. samples some of the energy of the command passing through it and presents to the control input of the crosspoint 55.1 etc. connected to it a signal which has the same optical frequency Fbj and the same duration as the incident command.

When at time Tj the command passes through the coupler 56.j the sampled signal causes operation of the crosspoint 55.j tuned to the control frequency Fbj by the process already described (FIG. 5A). The signal obtained from the optical sample present at this time at the input of the crosspoint is therefore amplified and transferred to the output of the crosspoint where it reproduces the incident optical sample and constitutes the switched optical sample.

The switched optical sample is passed from the output 51.j (FIG. 5A) or 51, through the coupler 58 (FIG. 5C) or the series of couplers 58.j through 58.k (FIG. 5D), to the input of the optical distributor OD (FIG. 1B).

At any time Tj a multiplicity of samples with different optical carrier frequencies propagating in the same time-division switching unit TSU can be switched simultaneously and can therefore appear simultaneously at the output(s) of the switch.

However, because of the process for generating commands for the time-division switching unit TSU described previously, only one sample can be switched in all of the time-division switching units TSU at any time Tj, namely that with the given optical carrier frequency Fa2i. All the optical samples reaching the inputs of the distributor at time Tj are therefore spectrally different and therefore can be spectrally multiplexed without risk of corrupting the information they carry.

At each time Tj the optical distributor OD spectrally multiplexes all the switched optical samples from the outputs of the time-division switching units TSU, each at a different optical frequency from the group Fa2 of optical frequencies, and the optical signals from the ports Ic and Ib, each with a respective optical carrier frequency from the group Fa1 or the group Fa3 of optical frequencies, depending on the type of port, and distributes to each of its outputs a spectral multiplex formed by all the optical samples and signals present at its inputs, the energy of each incident signal or sample being divided equally between all the outputs.

The s optical wavelength filters WF, like the wavelength filters WF1, each connected to one output of the distributor, transparent to the optical frequencies from the group Fa1, possibly tuned to one or more of the optical frequencies Fa3, and each tuned to a specific optical frequency from the group Fa2 of frequencies, or a band of optical frequencies from the group Fa2 of optical frequencies as already explained with reference to FIG. 1B and the description of overall operation, select the incident spectral multiplex and amplify only the optical samples and signals with the carrier frequencies to which they are tuned, and transmit to their output and therefore to the output of the switching network SSTSN to which their output is optically connected, such as the output O1 for the filter WF1, a spectral multiplex containing only the spectrally selected signals and samples, the sequence of which in time forms the time-division multiplexes CEM, BCM and URM or CRM or SRM, each with a respective optical carrier frequency from the group Fa1, Fa3 and Fa2 of optical frequencies of the set Fa of transmit optical frequencies.

The previous description includes a description of a first embodiment of the switching network SSTSN comprising n "controlled propagation" optical time-division switching units TSU, each associated with an input line, each comprising: first and second multiple port delay lines in which the samples to be switched and the respective switching commands propagate synchronously, and a multiplicity of optically controlled crosspoints each connected by an input to an output of said first delay line and by a control input to an output of said second delay line, the outputs of the crosspoints being connected to the outputs of the switching network. These time-division switching units TSU are of the output controlled type.

This type of switching unit operates satisfactorily but has economic disadvantages:
multiplicity of propagation means,
requirement for one switch per input line.

A second embodiment of the switching network SSTSN without these disadvantages will now be described with reference to FIGS. 7 through 11.

Figure 7:
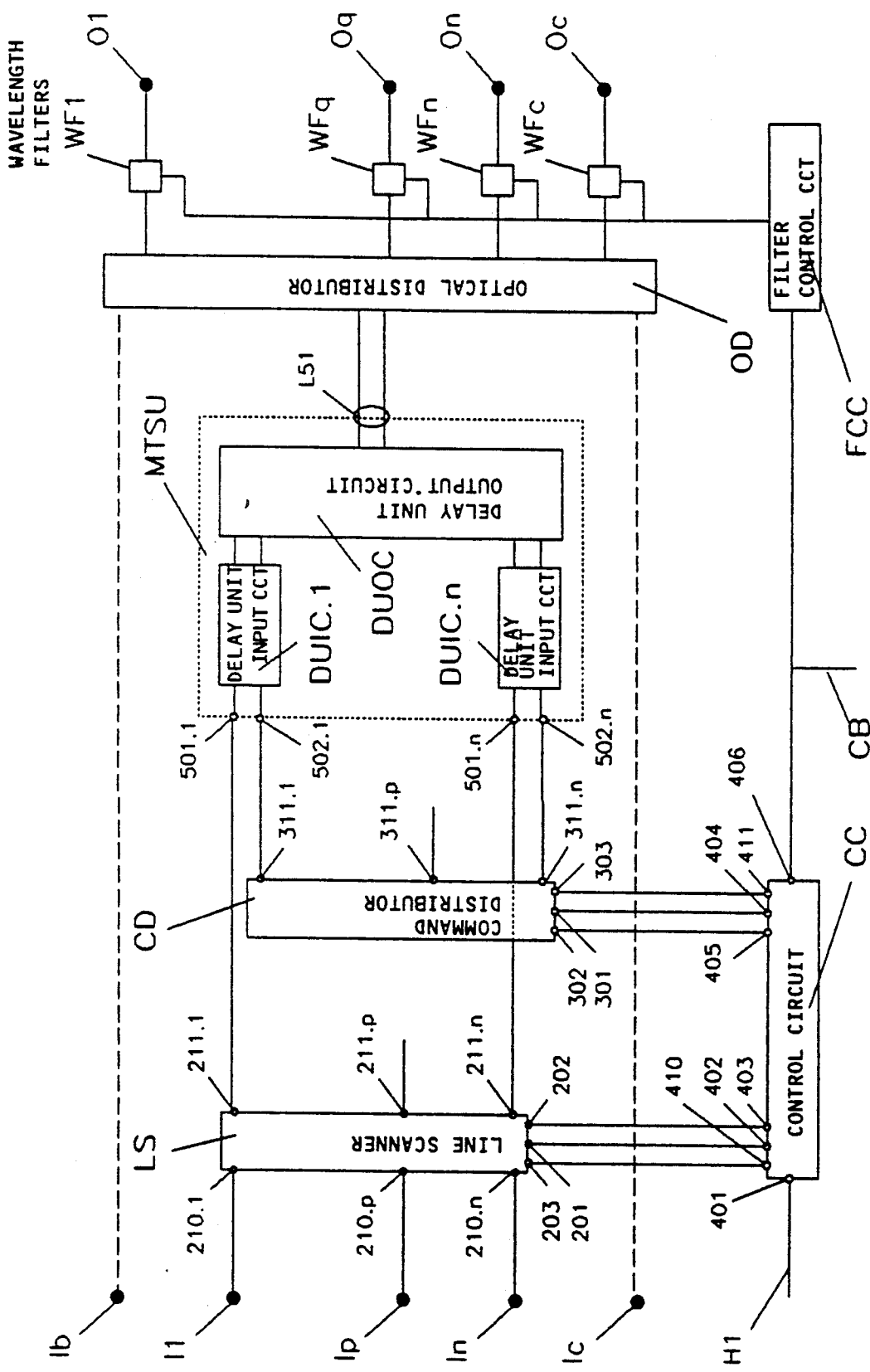
FIG. 7 is a schematic showing a second embodiment of the spectro-time-division switching network.

FIG. 7 is a schematic showing a second embodiment of the switching network SSTSN from FIG. 1A. In this second embodiment of the switching network SSTSN the controlled propagation optical time-division switching units TSU1 through TSUn of the the first embodiment are replaced with optical multiple time-division switching units MTSU; the other arrangements are the same as those of the first embodiment:
optical inputs I1 through In, Ib and Ic,
optical outputs O1 through Oq, On and Oc,
synchronization line H1 and control bus CB of the switching network SSTSN,
optical input line scanner LS,
control circuit CC,
optical command distributor CD,
optical distributor OD,
optical filters WF1 through WFs,
filter control circuit FCC for filters WF1 through WFs.

The multiple time-division switching units MTSU of the switching network SSTSN have:
n inputs 501.1 through 501.n each connected optically to an output 211.1 through 211.n of the optical input line scanner circuit LS,
n control inputs 502.1 through 502.n each connected optically to an output 311.1 through 311.n of the optical command distributor CD, and
optical outputs L51 each connected optically to an input of the optical distributor OD.

Said multiple time-division switching units MTSU comprise:
n delay unit input circuits DUIC.1 through DUIC.n each having an optical input connected optically by one of the inputs 501.1 through 501.n to an output of the optical line scanner LS and an optical control input connected optically by one of the control inputs 502.1 through 502.n to an output of the optical command distributor CD, and
a delay unit output circuit DUOC connected optically at its input to the delay unit input circuits DUIC.1 through DUIC.n and by each of its outputs to the optical distributor OD.

Figure 8A:
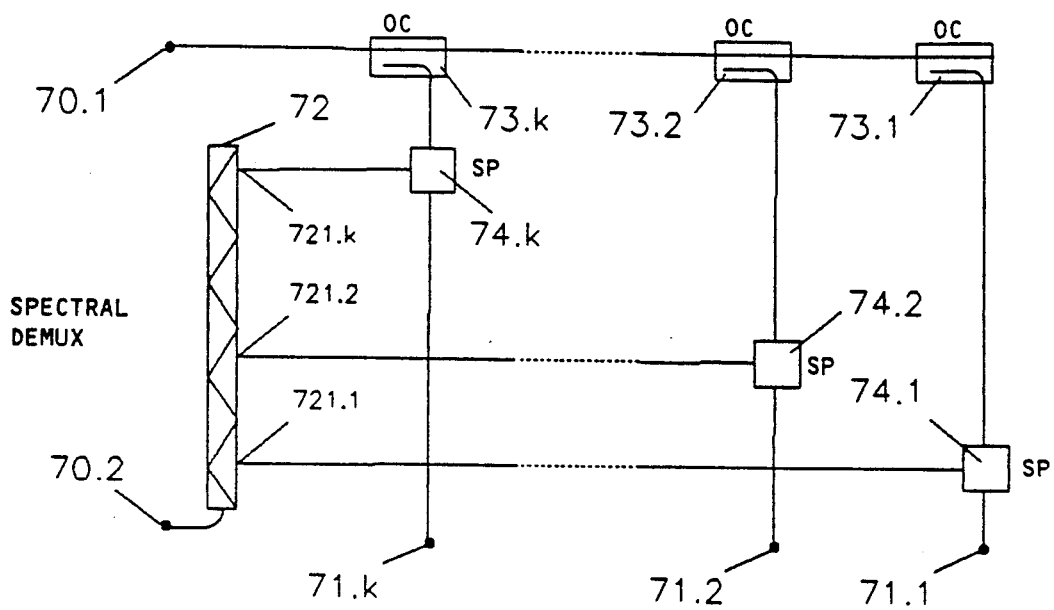
FIGS. 8A, 8B, 9A and 9B are schematics showing various circuits constituting multiple time-division switching units used in this second embodiment, as follows.

FIG. 8A is a schematic showing one embodiment of a delay unit input circuit DUIC in which:
an optical input 70.1 and an optical control input 70.2 are connected optically to the outputs of the line scanner LS and the command distributor CD, respectively, as already described, and
k optical outputs 71.1 through 71.k are connected optically to inputs of the delay unit output circuit DUOC in the various arrangements described below with reference to FIGS. 10A through 11B.

The delay unit input circuit DUIC comprises:
an optical distributor in the form of the series combination of k optical couplers 73.1 through 73.k each having an input and first and second outputs, the couplers being connected in series by connecting the input of one to the first output of the next with the exception of the last coupler 73.k whose input is connected to the input 70.1 of the input circuit,
k optically controlled optical crosspoints 74.1 through 74.k, each crosspoint 74.i having an input connected to the second output of the same ranked optical coupler 73.i and an output connected to the output of the same ranked output 71.i of the input circuit and an optical control input, and
a spectral demultiplexer 72 having an optical input connected to the control input 70.2 of the input circuit and k outputs 721.1 through 721.k each connected to the optical control input of the same ranked crosspoint 74.i.

Figure 8B:
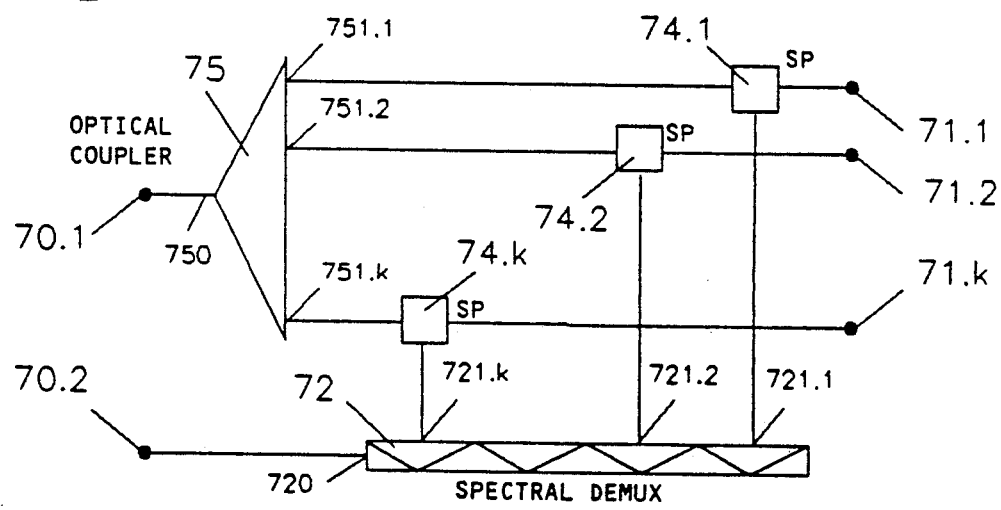

FIG. 8B is a schematic showing an embodiment of a delay unit input circuit DUIC comprising an optical distributor, k optically controlled optical crosspoints 74.1 through 74.k and a spectral demultiplexer 72 in which the optical distributor is in the form of an optical coupler 75 having an input 750 connected to the input 70.1 of the input circuit and k outputs 751.1 through 751.k connected to the input of the same ranked crosspoint 74.i, all other arrangements being identical to the similar arrangements already described with reference to FIG. 8A.

Figure 9A:
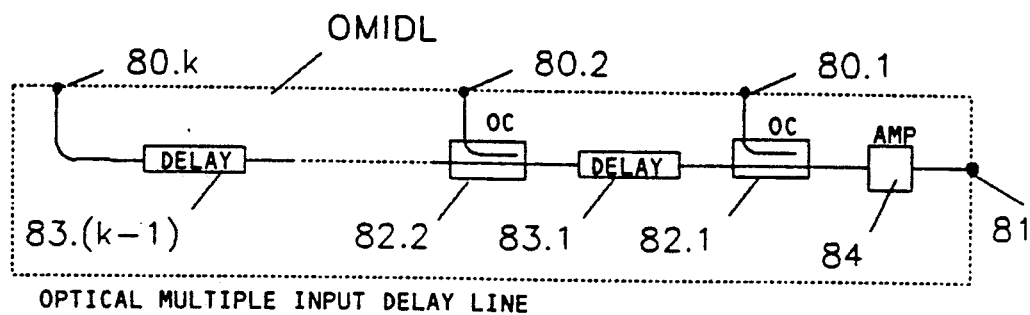

FIG. 9A is a schematic showing an optical multiple input delay line OMIDL used in the delay unit output circuit DUOC. This optical multiple input delay line has k optical inputs 80.1 through 80.k and an optical output 81 connected optically to an input of the optical distributor OD and is formed by the series combination of $k-1$ identical optical delay lines 83.1 through 83.$(k-1)$, $k-1$ optical couplers 82.1 through 82.$(k-1)$ and a broadband optical amplifier 84 having an input and an output. Each optical coupler 82.i has a first input connected by a delay line 83.i to an output of the next optical coupler, except for the last coupler 82.$(k-1)$ whose first input is connected by a delay line 83.$(k-1)$ to the input 80.k and except for the first coupler 83.1 whose output is connected to the input of the optical amplifier 84 whose output is connected to the optical output 81. Each coupler 82.i has a second input connected to the same ranked input 80.i.

Figure 9B:
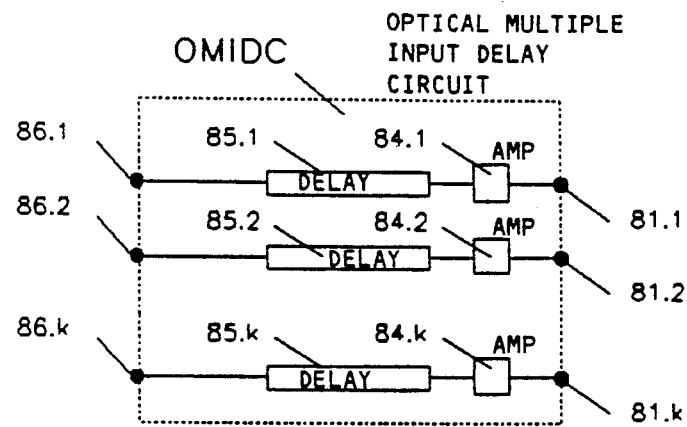

FIG. 9B is a schematic showing an optical multiple input delay circuit OMIDC used in the delay unit output circuit DUOC. This optical multiple input delay circuit has k optical outputs 81.1 through 81.k each connected optically to one input of the distributor OD and k optical inputs 86.1 through 86.k and is formed by k further optical delay lines 85.1 through 85.k and k broadband optical amplifiers 84.1 through 84.k. Each amplifier has one input and one output. Each optical delay line 85.i has an input connected to the same ranked input 86.i of the circuit OMIDC and an output connected to the input of the same ranked optical amplifier 84.i whose output is connected to the same ranked output 81.i of the circuit OMIDC. Each delay line 85.i introduces a delay whose value depends on its rank.

Figure 10A:
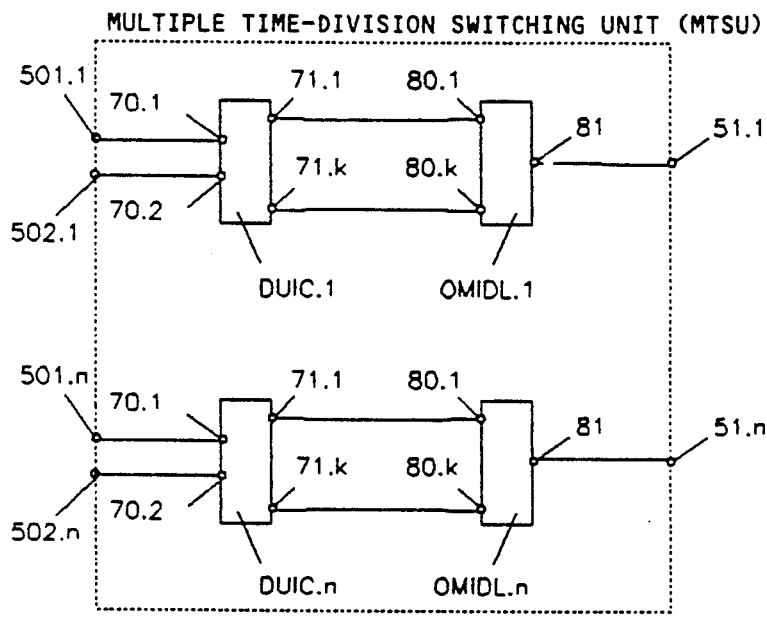
FIGS. 10A and 10B each show a respective version of a first mode of organisation of the multiple time-division switching units.
Figure 10B:
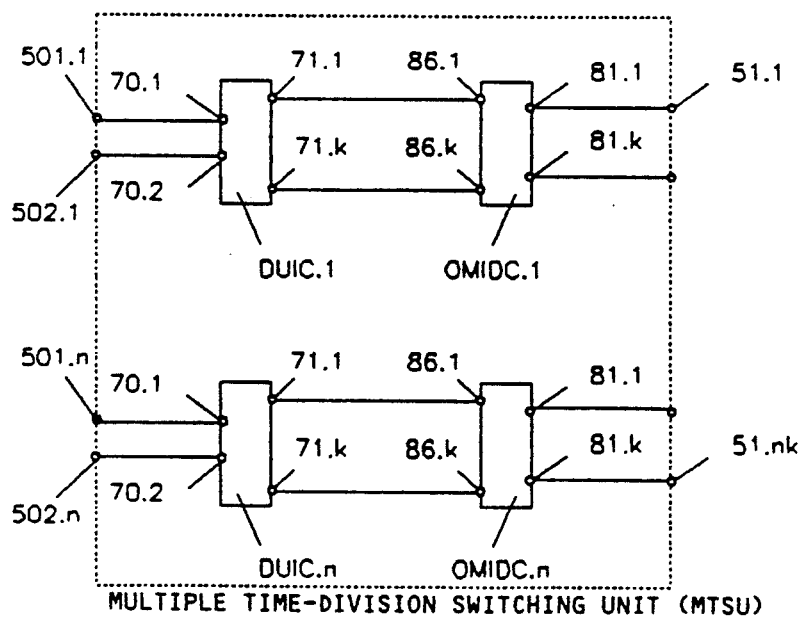

FIGS. 10A and 10B each show one version of a first mode of organizing the multiple time-division switching units MTSU made up of n delay unit input circuits DUIC.1 through DUIC.n and a delay unit output circuit DUOC. In this first mode of organisation the delay unit output circuit DUOC comprises n time slot interchange means each associated with an input circuit DUOC.i. These are:

in the FIG. 10A circuit: n optical multiple input delay lines OMIDL.1 through OMIDL.n of the type shown in FIG. 9A, and in the FIG. 10B circuit: n optical multiple input delay circuits OMIDC.1 through OMIDC.n of the type shown in FIG. 9B.

In these figures, each optical multiple input delay line OMIDL.i or each optical multiple input delay circuit OMIDC.i is associated with a delay unit input circuit DUIC.i, the outputs 71.1 through 71.k of said input circuit being optically connected to the same ranked inputs 80.i through 80.k of the associated delay line OMIDL.i (FIG. 10A) or to the same ranked inputs 86.1 through 86.k of the associated delay circuit OMIDC.i (FIG. 10B).

Figure 11A:
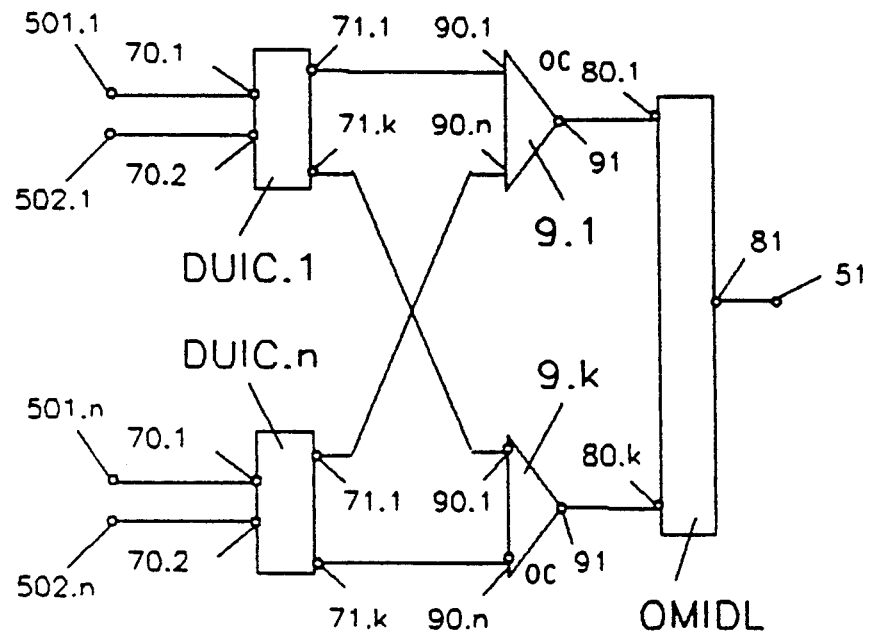
FIGS. 11A and 11B each show a respective version of a second mode of organisation of the multiple time-division switching units.
Figure 11B:
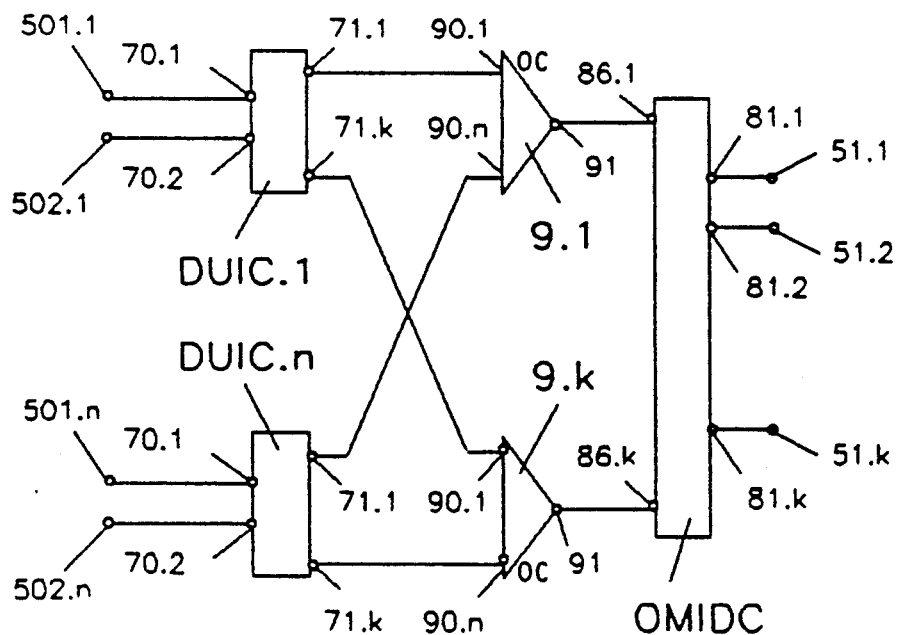

FIGS. 11A and 11B each show one version of a second mode of organization of the multiple time-division switching unit MTSU. They comprise n delay unit input circuits DUIC.1 through DUIC.n and a delay unit output circuit DUOC. In this second mode of organization the delay unit output circuit DUOC comprises:

k optical combiners 9.1 through 9.k each having n optical inputs 90.1 through 90.n and an output 91, each combiner being connected optically at its input to each of the delay unit input circuits DUIC.1 through DUIC.n, the input 90.j of a combiner 9.i being connected to the output 71.i of a delay unit input circuit DUIC.j, and a single time slot interchange unit. These are:

in the FIG. 11A circuit: a single optical multiple input delay line OMIDL of the type shown in FIG. 3A, each input 80.1 through 80.k of which is connected to the output 91 of the same ranked optical combiner 9.i, or in the FIG. 11B circuit: a single optical multiple input delay circuit OMIDC of the type shown in FIG. 3B of which each input 86.1 through 86.k is connected to the output 91 of the same ranked optical combiner 9.i.

The following points, which apply equally to the second embodiment of the switching network SSTSN, must be born in mind:

Each user and signalling transmitter line UEL and SEL carries in time slots of duration T an optical sample constituting a transmitted message whose optical frequency Fa2.i characterizes a destination line.

In a given time slot period Ti the line scanner circuit LS produces a output label multiplex OLM by sampling time slots presented to its inputs I1 through In by the user and signalling transmitter lines UEL and SEL.

The frame of the output label multiplex OLM has the same duration T as the input time slots and a payload (usable number of channels) at least equal to the number of transmitter lines.

The control circuit CC produces commands for switching the optical samples from the signals of the output label multiplex OLM and according to the load on the destination lines.

Said commands are each formed by an optical signal at an optical frequency Fbi from a second set Fb of optical frequencies in which each optical frequency characterizes a real time propagation delay to be applied in the optical time-division switching unit to the sample to be switched and also characterizes the address of an optically controlled crosspoint in the time-division switching unit.

Said commands are multiplexed onto a control label multiplex CLM whose frame is identical to the frame of the output label multiplex OLM and each time slot of which is associated with a transmitter line and carries at time Ti a switching command relative to the sample carried in the time slot of the transmitter line during the time interval Ti.

At time Ti+1 the line scanner LS transmits to its outputs 211.1 through 211.n the samples presented at time Ti to its inputs by the transmitter lines and the optical distributor CD transmits to each of its outputs 311.1 through 311.n the commands for switching these samples, said samples and commands having the same duration T.

The operation of the second embodiment of the switching network SSTSN, that shown in FIG. 7, will now be described:

A delay unit input circuit DUIC.i receives at its input 501.i a sample to be switched and at its input 502.i the command for switching said sample (hereinafter, the samples to be switched and the commands are assumed to have the respective optical carrier frequencies Fa2.i and Fbj).

The sample is presented (FIG. 8A) to the input 70.1 of the optical distributor device which distributes a signal representing it to the input of each of the optically controlled crosspoints 74.1 through 74.k.

The command is presented to the input 70.2 of the spectral demultiplexer which routes it to the output 721.j appropriate to its optical frequency Fbj, from which output it is transmitted to the control input of the crosspoint 74.j, during the period T of the command. The crosspoint 74.j is active so that the sample signal at its input propagates from its input to the output 71.j.

From this output, via the combiner 9.j (FIG. 11A), the sample reaches the input 80.j of the optical multiple input delay line OMIDL in which (FIG. 9) it is transferred by the coupler 82.j in the optical delay line. Its propagation is delayed by a time T by each optical delay line it passes through.

At time Ti+j the sample amplified by the optical amplifier 84 reaches the output 81 and is then propagated in the optical distributor OD which distributes it to all its outputs, where it is selected and amplified by the filter WFi tuned to its optical carrier frequency Fa2.i and then transmitted to the destination line.

Because it transmits and switches the communication signals by optical means alone, the communication system in accordance with the invention eliminates the use of electro-optical and opto-electrical converter devices between the optical transmission means and the switching means of known asynchronous time-division switching systems. It therefore represents a saving in terms of resources and a simplification in terms of the structure of communication networks, with consequential simplification of operation and enhancement of overall reliability.

When the system operates in ATM mode, the transmit and receive resources of multi-service terminals can be reduced to a single transmitter and a single receiver without altering the capacity of the terminal to handle a multiplicity of simultaneous calls to different destinations, which is not the case with known optical frequency-domain systems.

Because it manages the optical frequencies dynamically, assigning them only to terminals which are active, it enables the connection of a number of terminals larger than the number of optical frequencies that can be discriminated in the spectrum, the number of terminals that can be connected depending on the characteristics of the traffic and not merely on the number of optical frequencies that can be discriminated.

Because it conveys the information in the form of optical samples encoded in terms of optical frequency according to the destination, the optical frequencies of the samples are sufficient for optical means to generate the switching commands without any operation on the optical samples other than sampling some optical energy. This represents a saving in terms of resources in the control devices, which no longer require the use of means to demodulate, analyze and modulate the transmitted information as are needed in known ATM systems; in comparison with these known systems, it simplifies the operation of the switching means; also, it improves the security of signal transmission, as no operations are performed on the transmitted information.

Because the system conveys information in the form of optical samples which, as they pass through the transmission and switching means, are subject to no processing other than optical amplification, propagation in delay lines, spectral multiplexing and spectral filtering, all of which processes are known not to degrade the signals concerned:

it is insensitive to the nature of the information transmitted, which can be digital information or an analog signal, it can handle both types of information simultaneously and with no specific discrimination between them, it therefore widens the field of potential applications for multi-service systems.

Because it uses only optical technology to implement the switching means, and because of the simplicity of the resources employed, all of the switching device (including its control part) being controlled entirely by a clock signal and optical signals obtained directly from the samples to be switched, the system provides an original and economic solution to the complex problems of ATM switching.

The system in accordance with the invention therefore represents real progress with respect to the prior art in broadband multi-service communication network in terms of the ease of organizing such networks, the savings in resources that it represents and the security it offers in the transmission of information signals.

Of course, the invention is in no way limited to the embodiments described and shown which have been described and shown by way of example only; in particular, without departing from the scope of the invention some means may be modified or replaced by equivalent means.

There is claimed:

1. Asynchronous time-division multiplex optical communication system comprising: a switching network, q user receiver circuits connected by at most q optical user receiver lines to the switching network, p user transmitter circuits each connected to the switching network by an optical user transmitter line, said user transmitter circuits and user receiver circuits being divided between: x remote communication terminals each having a user transmitter circuit and a user receiver circuit, y transmit terminals each having a user transmitter circuit, z receive terminals each having a user receiver circuit; wherein each user receiver circuit comprises:

at least one optical control receiver tuned to an optical frequency from a first group of optical frequencies of a first set of optical frequencies;

an optical transmission receiver which can be tuned to any optical frequency of a second group of optical frequencies of said first set of optical frequencies;

optical frequency tuning means for said optical transmission receiver;

and means for temporal synchronization of the received information; each user transmitter circuit comprises:

an optical transmission transmitter that can be tuned to any optical frequency of said second group of optical frequencies;

optical frequency tuning means for said optical transmitter;

and temporal synchronization and phase alignment means for the information to be transmitted; the switching network comprises:
an optical spectro-time-division switching network;
a control processor unit;
and a clock unit;
  the spectro-time-division switching network is connected optically to the optical transmitter lines and to the optical receiver lines;
  the control processor unit comprises:
at least one control transmitter circuit having an optical control transmitter tuned to an optical frequency of said first group of optical frequencies;
at least one signalling transmitter having an optical transmission transmitter that can be tuned to any optical frequency of said second group of optical frequencies;
at least one control receiver circuit and at least one signalling receiver each having at least one optical control receiver tuned to an optical frequency of said first group of optical frequencies and an optical transmission receiver which can be tuned to any optical frequency of said second group of optical frequencies; said control processor unit is connected to the spectro-time-division switching network by:
a control bus;
at least one optical control transmitter line, each of which is connected optically to the optical control transmitter of a control transmitter circuit;
at least one optical control receiver line, each of which is connected optically to the optical control and transmission receivers of a control receiver circuit;
and at least one optical signalling transmitter line, each of which is connected optically to the optical transmitter of a signalling transmitter;
at least one optical signalling receiver line, each of which is connected optically to the optical control and transmission receivers of a signalling receiver;
and the clock unit is connected by a first synchronization line to the spectro-time-division switching network and by a second synchronization line to the control processor unit.

2. Optical communication system according to claim 1 wherein each control transmitter circuit transmits on its control transmitter line a control transmitter line a control transmitter multiplex signal distributed by the spectro-time-division switching network to each of the optical control receiver lines, signalling receiver lines and user receiver lines;
  each control transmitter multiplex signal has an optical carrier frequency from the first group of optical frequencies of the first set of optical frequencies;
  an optical frequency of the second group of optical frequencies of said first set of optical frequencies is allocated dynamically by said control processor unit to each active transmission receiver of the control receiver, signalling receiver and user receiver circuits; each user transmitter circuit and signalling transmitter communicating with any active transmission receiver by transmitting a message in the form of a series of optical pulses encoded at the optical frequency allocated to said active transmission receiver; said optical samples being transmitted by each user transmitter circuit in a user transmitter multiplex signal on its user transmitter line and by each signalling transmitter in a signalling transmitter multiplex signal on its signalling transmitter line;
  each of said user transmitter and signalling transmitter multiplex signals comprising spectro-time-division multiplex signals comprising a frameless succession of time slots with the same duration each carrying an optical sample at an optical frequency characterizing the destination transmission receiver;
  each optical sample is optically time-division switched by the spectro-time-division switching network according to its optical carrier frequency; and is then optically routed to one of said receive optical lines, on which it is carried by a first free time slot of a receive time-division multiplex signal of said receiver line;
  and each receive time-division multiplex signal comprises a succession of identical time slots with the same duration each carrying one optical sample, the optical samples of the same receive time-division multiplex signal all having the same optical frequency.

3. Optical communication system according to claim 1 further comprising at least one broadcast server, each server being connected optically to the spectro-time-division switching network by an optical broadcasting line connected in the server to at least one optical broadcast transmitter;
  the user receiver circuits have at least one optical broadcast receiver, said optical broadcast receivers of a user receiver circuit being connected optically to the user receiver line connecting said terminal to the spectro-time-division switching network;
  said optical broadcast transmitters and optical broadcast receivers can be tuned to any optical frequency from a third group of optical frequencies of said first set of optical frequencies;
  and at least one optical frequency of said third group of optical frequencies is allocated to each broadcast transmitter, each broadcast transmitter transmitting, at said allocated frequency, a message broadcast by the spectro-time-division switching network on each of the user receiver lines, each broadcast receiver receiving said message by tuning to said frequency allocated to the broadcast transmitter which transmitted it.

4. Optical transmission system according to claim 1 wherein the spectro-time-division switching network comprises:
  an optical line scanner connected optically to the optical user transmitter lines and to the optical signalling transmitter lines, said optical transmitter lines each carrying a transmit spectro-time-division multiplex signal comprising time slots each carrying an optical information sample;
  an optical command distributor;
  a control circuit connected optically:
    to the optical line scanner by a first optical line carrying an output label multiplex signal comprising as many time slots as there are transmitter lines;
    to the optical command distributor by a second optical line carrying a control label multiplex signal having a number of time slots equal to that of said output label multiplex signal, each time slot of the control label multiplex signal being in phase temporally with a same ranked time slot of said output label multiplex signal and carrying a command; and to the synchronization generator by the first synchronization line: and connected to the control processor unit by a control bus;

n controlled propagation optical time-division switching units each connected optically to an output of the optical line scanner and to an output of the optical command distributor;

an optical distributor connected optically to the output of the time-division switching units and to the optical control transmitter lines and having outputs each connected optically to the input of an optical filter;

s optical wavelength filters each connected optically to the output of an optical user receiver line, signalling receiver line, control receiver line;

a filter control circuit connected to the input of the control bus and to the output of a control input of each optical wavelength filter.

5. Optical communication system according to claim 4 wherein the optical line scanner and the optical command distributor have a common fourth control device;

the optical line scanner circuit comprises an optical selector having:
. n optical selector switches in series, each having first and second inputs, an output and a control input;
. n optical selector couplers each having an input and first and second outputs;
. and n identical optical selector delay lines;

the optical selector switches are connected in series by connecting the output of one to the first input of the next, the output of a last optical selector switch being connected optically to the control circuit by said first optical line;

the second input of each optical selector switch is connected to the second output of the same ranked optical selector coupler;

each optical selector couplers has its input connected optically to an input of the optical line scanner and its first output connected to the input of an optical selector delay line; an output of said delay line being connected optically to a controlled propagation time-division switching unit;

the distribution line comprises:
. n optical distributor switches each having an input, first and second outputs and a control input;
. n optical amplifiers with a hysteresis characteristic (as herein defined) and n optical distributor delay lines each having a different length characterizing the rank i of the optical distributor delay line;

the optical distributor switches are connected in series by connecting the first output of one to the input of the next, the input of the first optical distributor switch being connected optically to the control circuit by said second optical line;

the second output of each optical distributor switch is connected by an optical amplifier with a hysteresis characteristic (as herein defined) to the input of an optical distributor delay line; the output of said delay line being connected optically to a controlled propagation time-division switching unit;

the fourth control device comprises:
. n optical selector control couplers;
. n optical distributor control couplers;
. n optical control delay lines, each optical selector control coupler and each optical distributor control coupler having one input and first and second outputs;

the first output of an optical selector control coupler is connected by an optical control delay line to the input of an optical distributor control coupler whose first output is connected to the input of the next optical selector control coupler, except for the last optical distributor control coupler whose first output is connected optically to the control circuit, the input of a first optical selector control coupler being connected optically to the control circuit;

the second output of each optical selector control coupler is connected to the control input of a same ranked optical selector switch;

and the second output of each optical distributor control coupler is connected to the control input of a same ranked optical distributor switch.

6. Optical communication system according to claim 4 wherein outputs of the optical distributor are connected optically to inputs of broadcast servers by optical broadcasting lines.

7. Optical communication system according to claim 4 wherein the optical line scanner comprises an optical selector and a first control device;

the optical selector comprises:
n optical switches in series, each having first and second inputs, an output and a control input;
n optical couplers each having an input and first and second outputs;
and n identical optical delay lines;

the optical switches are connected in series by connecting the output of one to the first input of the next, the output of the last optical switch being connected optically to the control circuit by said first optical line;

the second input of each optical switch is connected to the second output of the same ranked optical coupler;

each optical coupler has its input connected to an input of the optical line scanner and its first output connected to the input of an optical delay line; the output of said delay line being connected optically to a controlled propagation time-division switching unit;

the first control device comprises n optical control couplers each having: an input, first and second outputs and n−1 optical control delay lines;

the first output of each optical control coupler except for the last is connected to the input of an optical control delay line; the output of said delay line being connected to the input of the next optical control coupler;

the input of a first optical control coupler and the first output of a last optical control coupler are connected optically to the control circuit;

and the second output of each optical control coupler is connected optically to the control input of a same ranked optical switch of the optical selector.

8. Optical communication system according to claim 7 wherein the second input of each optical switch is connected by an optical amplifier to the second output of the same ranked optical coupler; and the second output of each optical control coupler is connected optically by an optical amplifier to the control input of a same ranked optical switch of the optical selector.

9. Optical communication system according to claim 4 wherein the optical command distributor comprises a second control device and a distribution line;

the second control device comprises n optical control couplers and n−1 optical control delay lines each optical control coupler having an input and first and second outputs;

the first output of each optical control coupler except the last is connected to the input of an optical control delay line with its output connected to the input of the next optical coupler;

the input of a first optical control coupler and the first output of a final optical control coupler are connected to the control circuit;

the distribution line comprises n optical switches each having an input, first and second outputs and a control input, n optical amplifiers with a hysteresis characteristic (as herein defined) and n optical delay lines each having a different length characterizing the rank i of the delay line;

the optical switches are connected in series by connecting the first output of one to the input of the next, the input of a first optical switch being connected optically to the control circuit by said second optical line;

the second output of each optical switch is connected by an optical amplifier with a hysteresis characteristic (as herein defined) to the input of an optical delay line connected optically at the output to a controlled propagation time-division switching unit;

and the second output of each optical control coupler of the second control device is connected to the control input of the same ranked optical switch of the distribution line.

10. Optical communication system according to claim 9 wherein the second output of each optical control coupler of the second control device is connected by an optical amplifier to the control input of the same ranked optical switch of the distribution line.

11. Optical communication system according to claim 4 wherein the optical line scanner and the optical command distributor have a common third control device;

the optical line scanner comprises an optical selector having:
- n optical selector switches in series, each having first and second inputs, an output and a control input;
- . n optical selector couplers each having an input and first and second outputs;
- . and n identical optical selector delay lines;

the optical selector switches are connected in series by connecting the output of one to the first input of the next, the output of a final optical selector switch being connected optically to the control circuit by said first optical line;

the second input of each optical selector switch is connected to the second output of the same ranked optical selector coupler;

each optical selector coupler has its input connected to an input of the optical line scanner and its first output connected to the input of an optical selector delay line; the output of said delay line being connected to a controlled propagation optical time-division switching unit;

the distribution line comprises:
- . n optical distributor switches each having an input, first and second outputs and a control input;
- . n optical amplifiers with a hysteresis characteristic (as herein defined) and n optical distributor delay lines each having a different length characterizing the rank i of the distribution delay line;

the optical distributor switches are connected in series by connecting the first output of one to the input of the next, the input of a first optical distributor switch being connected optically to the control circuit by said second optical line;

the second output of each optical distributor switch is connected by an optical amplifier with a hysteresis characteristic (as herein defined) to the input of an optical distributor delay line, the output of said delay line being connected optically to a controlled propagation time-division switching unit;

the third control device comprises:
- . n optical selector control couplers;
- . n optical distributor control couplers;
- . n first optical delay lines;
- . and n−1 second optical delay lines; each optical selector control coupler and each optical distributor control coupler having an input and first and second outputs;

the first output of an optical selector control coupler is connected to one of the first optical delay lines connected to the input of an optical distributor control coupler; a first output of said coupler being connected by one of the second optical delay lines to the input of the next optical selector control coupler, except for the last optical distributor control coupler whose first input is connected optically to the control circuit, the input of a first optical selector control coupler being connected optically to the control circuit;

the second output of each optical selector control coupler is connected to the control input of a same ranked optical selector switch;

and the second output of each optical distributor control coupler is connected to the control input of a same ranked optical distributor switch.

12. Optical communication system according to claim 11 wherein the second input of each optical selector switch is connected to the second output of the same ranked optical selector coupler by an optical amplifier; the second output of each optical selector control coupler is connected by an optical amplifier to the control input of a same ranked optical selector switch; and the second output of each optical distributor control coupler is connected by an optical amplifier to the control input of a same ranked optical distributor switch.

13. Optical communication system according to claim 4 wherein the output label multiplex signal is obtained by sampling time slots present at the same time at the input of the line scanner on each of the transmitter lines;

each time slot of the control label multiplex signal having the same rank as a transmitter line carries a command comprising an optical signal at an optical frequency from a second set of optical frequencies in which each optical frequency characterizes a real time propagation delay to be applied in a time-division switching unit to the message carried by the time slot of said transmitter line; said optical frequency being determined by the control circuit;

and the optical command distributor supplies to each time-division switching unit, corresponding to the rank of a time slot of the control label multiplex signal, the command carried by said time slot of the control label multiplex signal.

14. Optical communication system according to claim 13 wherein the control circuit comprises:
- a command generator connected optically to the line scanner, to the command distributor and to the clock unit by the first synchronization line and to the control processor unit by the control bus;
- and a control label multiplex generator connected optically to the line scanner by the first line and to the command distributor by the second line and to the control processor unit by the control bus.

15. Optical communication system according to claim 14 wherein the command generator comprises an optical calibrated pulse generator having: an input connected optically to the first synchronization line and an output connected to an input of an optical coupler; said coupler having a first output connected to a first input of a first optical switch and a second output connected by a first optical delay line to a first input of a second optical switch;
  the first and second optical switches each have a control input connected to the control bus;
  the first optical switch has a second input connected optically by a second optical delay line to the line scanner and an output connected optically by a third optical delay line to the line scanner;
  and the second optical switch has a second input connected by a fourth optical delay line to the command distributor and an output connected by a fifth optical delay line to the command distributor.

16. Optical communication system according to claim 14 wherein the command generator comprises an optical calibrated pulse generator connected optically at its input to the first synchronization line and at its output to a first input of an optical switch; said switch having: a second input connected by an optical delay line to the line scanner, an output connected optically by another optical delay line to the line scanner and a control input connected to said control bus.

17. Optical communication system according to claim 14 wherein the control label multiplex generator comprises:
- a spectral demultiplexer having an input connected optically to the line scanner by the first line and f outputs;
- f command generators;
- a supervisor having f outputs and an input connected to the control bus;
- a synchronization circuit having an input and f outputs;
- an optical coupler having f inputs and an output connected to an input of an output optical coupler having: a first input connected optically by a delay line to the second line and a second output connected optically to the input of the synchronization circuit;
  and each generator has: a first input connected optically to an input of the spectral demultiplexer, a second input connected to an output of the supervisor, a third input connected to an output of the synchronization circuit, and an output connected to an input of the optical coupler; each generator delivering optical commands for the controlled propagation time-division switching units; each command being transmitted on the second line at an optical frequency of said second set of optical frequencies; said optical frequency characterizing a propagation time in the time-division switching unit to which the command is addressed.

18. Optical communication system according to claim 17 wherein each generator comprises: an optical coupler having an input connected to the first input of the generator and first and second outputs; an optical switch having an input connected to the first output of the coupler; an optical source having an excitation input connected to the output of the optical switch and having an output which constitutes the output of the generator; an optical detector having an input connected by an optical delay line to the second output of the optical coupler; a counter having an output connected to a first input of a tuning signal generator having its output connected to a control input constituting the third input of the generator; said counter having: a first input connected to the output of the optical detector and to a first port, a second input connected to a second port, and a third input connected to a third port; said optical switch having a control input connected to a fourth port; said first, second, third and fourth ports constituting the second input of the generator connected to the supervisor.

19. Optical communication system according to claim 17 wherein the spectral demultiplexer comprises a passive distributor and f tunable optical filters each associated with a tuning circuit, and the passive distributor has an input connected optically to the line scanner and f outputs each connected optically to a tunable optical filter connected optically at its output to a generator.

20. Optical communication system according to claim 4 wherein each controlled propagation optical time division switching unit comprises identical first and second multiple input optical delay lines and k optically controlled optical crosspoints each having first and second inputs and an output;
  each optical multiple input delay line comprises k identical optical couplers in series with k−1 identical optical delay lines, each optical coupler having a first output connected by an optical delay line to an input of the next optical coupler, except for the last optical coupler whose first output is not used;
  a first optical coupler of the first multiple input delay line has its input connected optically to an output of the line scanner from which it receives the time slots of a transmitter line connected optically to the input of said line scanner circuit;
  a first optical coupler of the second multiple input delay line has its input connected optically to an output of the command distributor from which it receives, for each time slot of a transmitter line, a command in the form of an optical signal at an optical frequency from a second set of optical frequencies, said optical frequency characterizing a propagation time in said first delay line;
  each optical coupler of the first multiple input delay line has a second output connected to the first input of an optical crosspoint;
  each optical coupler of the second multiple input delay line has a second output connected to the second input of an optical crosspoint, said second input being a control input of the optical crosspoint, each optical crosspoint being controlled by a command carried by an optical signal at an optical frequency corresponding to an operating frequency of said crosspoint;

and the output of each optical crosspoint constitutes an optical output of the time-division switching unit.

21. Optical communication system according to claim 20 wherein each output of an optical crosspoint is connected optically to an input of said optical distributor.

22. Optical communication system according to claim 20 wherein the outputs of the k optical crosspoints are connected to inputs of an optical coupler with k inputs and an output and in that said output is connected optically to an input of said optical distributor.

23. Optical communication system according to claim 20 wherein each time-division switching unit also comprises k output optical couplers each having first and second inputs and an output;

said output optical couplers are connected in series by connecting the output of one to the second input of the next, except for a last output optical coupler whose output is connected optically to an input of said optical distributor and of a first output optical coupler whose second input is not used;

and each output optical coupler has its first input connected to the output of an optical crosspoint.

24. Optical communication system according to claim 20 wherein each optical crosspoint comprises:
. an optical amplifier having an input, an output and a control input;
. an opto-electronic detector having an output connected to said control input and an input;
. and a tunable optical filter having an optical input which constitutes the second input of the optical crosspoint and an output connected to the input of said opto-electronic detector; and the input and the output of the optical amplifier constitute the optical first input and the optical first output of the optical crosspoint.

25. Optical communication system according to claim 1 wherein the spectro-time-division switching network comprises:
a line scanner connected optically to the optical user transmitter lines and to the optical signalling transmitter lines, said optical transmitter lines each carrying a transmit spectro-time-division multiplex signal comprising time slots each carrying an optical information sample;
an optical command distributor;
a control circuit connected optically to the optical line scanner by a first optical line carrying an output label multiplex signal comprising as many time slots as there are transmitter lines; to the optical command distributor by a second optical line carrying a control label multiplex signal having the same number of time slots as said output label multiplex signal, each time slot of the control label multiplex signal being in phase with a same ranked time slot of said output label multiplex signal and carrying a command; and to the clock unit by the first synchronization line; and further connected to the control processor unit by the command bus;
controlled propagation optical multiple time-division switching units having:
n delay unit input circuits each connected optically to an output of the line scanner and to an output of the optical command distributor; and
a delay unit output circuit connected optically at its input to the input circuits;
an optical distributor connected optically to the output of the delay unit output circuit and to the optical control transmitter lines and having outputs each connected optically to the input of an optical filter;
s optical wavelength filters each connected optically at its output to one of the optical user receiver lines, signalling receiver lines, control receiver lines;
a filter control circuit connected by its input to the control bus and by its output to a control input of each optical wavelength filter.

26. Optical communication system according to claim 25 wherein the output label multiplex signal is obtained by sampling time slots present at the same time at the input of the line scanner on each of the transmitter lines;
each time slot of the control label multiplex signal having the same rank as a transmitter line carries a command comprising an optical signal at an optical frequency from a second set of optical frequencies in which each optical frequency characterizes a real time propagation delay to be applied in a multiple time-division switching unit to the message carried by the time slot of said transmitter line; said optical frequency being determined by the control circuit; and
the optical distributor supplies to each delay unit input circuit, corresponding to the rank of a time slot of the control label multiplex signal, the command carried by said time slot of the control label multiplex signal.

27. Optical communication system according to claim 25 wherein each delay unit input circuit comprises: an optical distributor, k optically controlled optical crosspoints and a spectral demultiplexer; the optical distributor having an input connected to an output of the line scanner and k outputs;
each optical crosspoint has: an input connected to the same ranked output of the optical distributor, an output connected to the input of the delay unit output circuit and a control input; and
the spectral demultiplexer has an input connected to an output of the distributor and k outputs connected to the control inputs of the k optical crosspoints.

28. Optical communication system according to claim 27 wherein the optical distributor comprises k optical couplers in series, each optical coupler having an input and first and second outputs, the second output of each coupler being connected to the input of a crosspoint, the couplers being connected in series by connecting the input of one of the first output of the next except for the last coupler whose input is connected to an output of the line scanner.

29. Optical communication system according to claim 27 wherein the optical distributor comprises an optical coupler having an input connected to an output of the line scanner and k outputs each connected to an input of a crosspoint.

30. Optical communication system according to claim 27 wherein the delay unit output circuit comprises n optical multiple input delay lines;
each optical multiple input delay line is associated with an input circuit and comprises k−1 identical optical couplers in series with k−1 identical delay lines, and an optical amplifier having an input and an output, each optical coupler having a first input connected by a delay line to an output of the next optical coupler except for the last coupler whose first input is connected by a delay line to an output of a crosspoint and except for the first coupler whose output is connected to the input of the optical amplifier whose output is connected to the input of the optical distributor;

and each coupler has a second input connected to an output of a crosspoint.

31. Optical communication system according to claim 27 wherein the delay unit output circuit comprises an optical multiple input delay line and k optical combiners having n and an output;

said optical multiple input delay lines comprises $k-1$ identical optical couplers in series with $k-1$ identical delay lines and an optical amplifier; each optical coupler having a first input connected by a delay line to an output of the next optical coupler except for the last coupler whose first input is connected by a delay line to the output of the last optical combiner and except for the first coupler whose output is connected to the input of the optical amplifier whose output is connected to the input of the optical distributor;

each coupler has a second input connected to an output of a same ranked optical combiner;

and each optical combiner is connected at its input to an output of a same ranked crosspoint of each of the delay unit input circuits.

32. Optical communication system according to claim 27 wherein the delay unit output circuit comprises n optical multiple input delay circuits;

and each optical multiple input delay circuit is associated with an input circuit and comprises k separate optical delay lines each applying a delay whose value depends on its rank and k optical amplifiers each having an input and an output; each optical delay line having an input connected to an output of a crosspoint and an output connected to an input of an optical amplifier whose output is connected to the input of the optical distributor.

33. Optical communication system according to claim 27 wherein the delay unit output circuit comprises an optical multiple input delay circuit and k optical combiners each having n inputs and an output;

said optical multiple input delay circuit comprises k further optical delay lines each applying a delay whose value depends on its rank and k optical amplifiers each having an input and an output; each optical delay line having an input connected to the output of a same ranked optical combiner and an output connected to an input of an optical amplifier whose output is connected to the input of the optical distributor;

and each optical combiner is connected at its input to an output of a same ranked crosspoint of each of the delay unit input circuits.

* * * * *